US009153029B2

(12) United States Patent
Bone

(10) Patent No.: US 9,153,029 B2
(45) Date of Patent: Oct. 6, 2015

(54) BLOCK PATTERNS AS TWO-DIMENSIONAL RULER

(75) Inventor: Donald James Bone, Wentworth Falls (AU)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/994,068

(22) PCT Filed: Dec. 13, 2011

(86) PCT No.: PCT/AU2011/001608
§ 371 (c)(1),
(2), (4) Date: Aug. 28, 2013

(87) PCT Pub. No.: WO2012/079117
PCT Pub. Date: Jun. 21, 2012

(65) Prior Publication Data
US 2014/0003740 A1    Jan. 2, 2014

(30) Foreign Application Priority Data

Dec. 15, 2010    (AU) .............................. 2010257224

(51) Int. Cl.
*G06T 7/00*    (2006.01)
*G01B 11/00*    (2006.01)

(52) U.S. Cl.
CPC ............ *G06T 7/0042* (2013.01); *G01B 11/002* (2013.01)

(58) Field of Classification Search
None
See application file for complete search history.

(56) References Cited

U.S. PATENT DOCUMENTS

| 6,813,035 B2 | 11/2004 | Hoffmann | |
|---|---|---|---|
| 2003/0123707 A1* | 7/2003 | Park | 382/106 |
| 2008/0049268 A1 | 2/2008 | Hardy | |
| 2010/0074532 A1* | 3/2010 | Gordon et al. | 382/203 |
| 2010/0209002 A1 | 8/2010 | Thiel et al. | |

OTHER PUBLICATIONS

Ozturk, C., J. Nissanov, and S. Dubin. "Generation of perfect map codes for an active stereo imaging system." Bioengineering Conference, 1996., Proceedings of the 1996 IEEE Twenty-Second Annual Northeast. IEEE, 1996.*
Morano et al.,"Structured Light Using Pseudorandom Codes", IEEE Transactions on Pattern Analysis and Machine Intelligence, pp. 322-327, Mar. 1998, vol. 20, No. 3.
(Continued)

*Primary Examiner* — Samir Ahmed
*Assistant Examiner* — Menatoallah Youssef
(74) *Attorney, Agent, or Firm* — Canon USA Inc. IP Division

(57) ABSTRACT

A two-dimensional pattern comprises a plurality of R-planes each comprising a tiling of a corresponding R-ary block, being a block of radix R integer values, where for each dimension of the pattern, the least common multiple of the sizes of the tiled blocks in that dimension is greater than the size of the tiling that dimension, and any sub-block of a size less than the tiled blocks occurs on a regular grid with the same periodicity as the tiled block for that R-plane. The pattern may be used in determining a position of a location captured in an image by projecting the pattern onto a scene. An image is captured. The method determines from the captured image a sub-block associated with the location and constructs, a unique integer value for each R-plane. The unique integer values from each R-plane are used to determine the location in the image.

15 Claims, 28 Drawing Sheets

(56) References Cited

OTHER PUBLICATIONS

Adan et al.,"Disordered Patterns Projection for 3D Motion Recovering" Proceedings of the 2nd International Symposium on 3D Data Processing, Visualization, and Transmission, Date: Sep. 6-9, 2004.
Morita, H., et al., "Reconstrution of Surfaces of 3-D Objects by M-array Pattern Projection Method", IEEE, 1988, pp. 468-473.
Ozturk, C., et al., "Generation of Perfect Map Codes for an Active Stereo Imaging System", pp. 76-77, Drexel University, Philadelphia, PA, Date Mar. 1996.
Pages, J., et al., "Overview of coded light projection techniques for automatic 3D profiling", Proceedings of the 2003 IEEE International Conference of Robotics and Automation, Sep. 14-19, 2003, pp. 133-138.

* cited by examiner

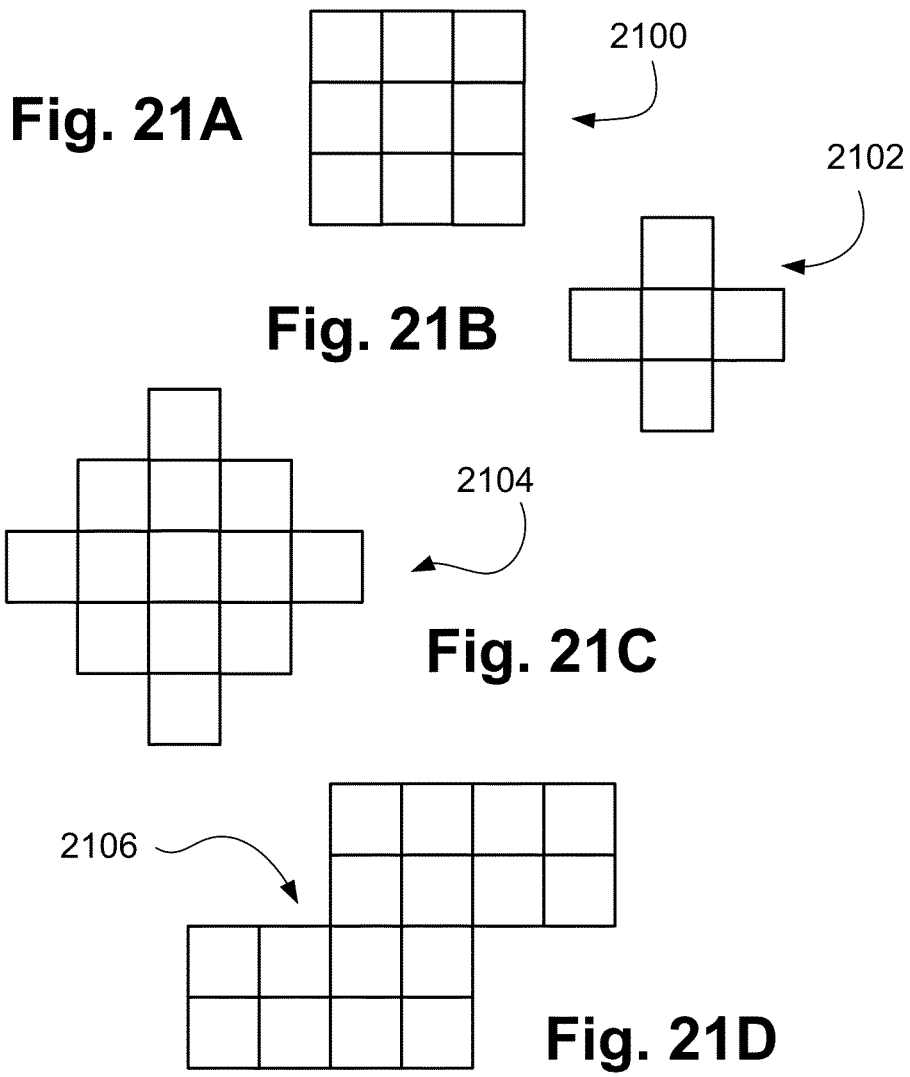
Fig. 21A
Fig. 21B
Fig. 21C
Fig. 21D
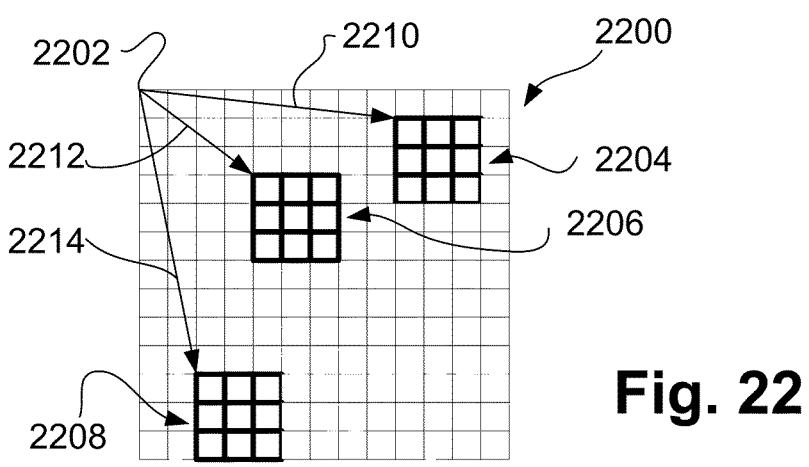
Fig. 22

BLOCK PATTERNS AS TWO-DIMENSIONAL RULER

CROSS-REFERENCE TO RELATED APPLICATIONS

This application is a National Stage of International Application PCT/AU2011/001608 filed Dec. 13, 2011, which claims the benefit of priority under the International (Paris) Convention and 35 U.S.C. §119 of the filing date of Australian Patent Application No. 2010257224, filed Dec. 15, 2010, the entire contents of the above applications being hereby incorporated by reference in their entirety as if fully set forth herein.

TECHNICAL FIELD

The present invention relates to the construction of two-dimensional (2D) patterns for coding position in an image and their application to alignment of projector/camera systems for the measurement of disparity by the projection of structured light.

BACKGROUND

Many methods for capturing three-dimensional (3D) scene depth information are known. Structured light methods rely on establishing a mapping from the coordinate system of a structuring pattern projected onto the scene to the coordinate system of an image captured by a camera viewing the scene illuminated by the structuring pattern. The projected structuring pattern can be regarded as a ruler pattern useful for measuring aspects of the scene. Once this mapping is determined, knowledge of the relative geometry of the projector and camera and calibration parameters of the camera and projector can be used to determine the depth map of the scene. There are many known ways of establishing this coordinate mapping, most being founded upon the trigonometric relationship of the projector and camera. The depth map can be used for a number of purposes, including 3D modelling of an object, and the adjustment of light and other imaging parameters to provide for better capturing of images.

One known way of establishing the coordinate mapping is through the use of coded structured light. It is known to generate patterns with a "2D window" property such that a defined 2D window around any discrete location in the pattern contains a sub-pattern (a window code) that is unique to that location. Projecting such a pattern onto the scene ensures that a dense set of correspondences between the captured image and the projected image can be obtained.

Much of the work to date has used binary codes such as de Bruin arrays (also known as de Bruin Tori or Perfect Maps) or M-arrays (also known as Semi-Perfect Maps). However, though such binary codes are relatively easy to construct, they have two disadvantages. Firstly, to code each location in a discrete image having M locations, the binary map must use a window containing at least $m \geq \log_2 (M)$ points. For large M this will require a large window which in applications such as Coded Structured Light can mean that local errors affect a larger portion of the map. Secondly, in these patterns all or almost all possible window codes will occur exactly once, which means that the pattern is not very robust to errors in the measurement of point values which can result from noise or variation in the surface reflectivity.

By using a K-ary rather than a binary code, the window need only contain $m \geq 2 \log_K (M)$ points, thus reducing the number of neighbourhood points required in the local window by a factor of $\log_2 (K)$. Occlusion in the 3D scene can result in some parts of the projected ruler pattern not being visible from the viewpoint of the camera. Because the local window size is smaller in a K-ary code, occlusion will affect a smaller number of points around an occlusion boundary than are affected in a binary code.

Constructing patterns which only sparsely use the set of all possible window codes means that a small local window can code for many more locations than are required over the full 2D-ruler pattern. Codes can then be chosen to enforce a minimum hamming distance in the code space between codes used in the pattern. Errors in the recovered image that lead to errors in the location code can then be detected and potentially corrected.

Such patterns are described in "*Structured Light Using Pseudorandom Codes*", R. A. Morano et. al., IEEE Transactions on Pattern Analysis and Machine Intelligence, Vol. 20, No. 3, March 1998, hereafter "Morano". Morano referred to the patterns as "perfect submaps" since the patterns used a subset of the possible codes available in the defined window, and used each code only once. To create the patterns, Morano used a brute force search. However Morano's approach becomes computationally expensive for even moderately large arrays, limiting the resolution that can be achieved in practice. With large arrays it is also necessary to address the problem of efficiently decoding the location from the window code.

In Coded Structured Light the captured image is subject to geometric distortion because of the 3D shape of the surface on which it is projected. This can complicate the process of extracting the window code. Many existing methods rely on having isolated elements (such as coloured spots) in their patterns so that the centres of each element can be identified to deal with geometric distortion. Requiring disjoint elements in the pattern limits the spatial resolution that can be achieved. A need exists for a technique that can be efficiently decoded for non-disjoint regions of the pattern.

Variation in the surface reflectivity (due to surface colour or fine scale texture of the reflecting surface) can result in spatial variations in the captured intensity which can greatly complicate the problem of accurately recovering the code. A need exists for an approach to coding the patterns that ensures robust recovery of the coded information.

SUMMARY

Disclosed is a two-dimensional pattern and a method of forming such a pattern, that can be imaged to provide for depth and 2D ruler measurements. The pattern has nil, or low and readily resolvable, ambiguity thereby permitting accurate measurement with minimal processing load.

The pattern is founded upon tiling of distinct perfect submaps in each of a number of R-planes such as bit-planes, with the submaps of each bit-plane being differently sized. The periodicity of tiling in the bit-planes and different sizes of the sub-maps results in the pattern having a single period. The pattern once formed may be stored or otherwise recorded for subsequent projection to a target, such as a shape or surface, and imaging by a camera to thereby permit features of the shape or surface to be assessed. Various applications of the pattern are also described.

In accordance with one aspect of the present disclosure, there is provided a two-dimensional pattern comprising a plurality of R-planes. Each R-plane comprises a tiling of a corresponding R-ary block, being a block of radix R integer values, such that for each dimension of the pattern, the least common multiple of each of the sizes of the corresponding tiled R-ary blocks in that dimension is greater than the size of the pattern in the same dimension, and such that any R-ary sub-block of a predetermined size less than the tiled R-ary blocks occurs only on a regular grid with the same periodicity as the tiled R-ary block for that R-plane.

Typically the radix of the R-planes is 2, by which the pattern is formed by bit-planes and binary blocks.

The pattern may be used in method of determining a two-dimensional position of a location captured in an image by projecting the two-dimensional pattern onto a three-dimensional scene. An image of the scene including the projected two-dimensional pattern is captured. The method determines from the captured image a sub-block associated with the location and constructs, from a R-ary representation of the sub-block, a unique integer value for each R-plane, being a representation of the pattern in the R-plane of the sub-block associated with the location. The method uses the unique integer values from each R-plane to determine the location in the image.

Numerous other aspects are also disclosed.

BRIEF DESCRIPTION OF THE DRAWINGS

At least one embodiment of the present invention will now be described with reference to the following drawings, in which:

FIGS. 21A-21D show some examples of code windows that may be used in alternate implementations;

FIG. 22 illustrates the concept of offsets within a tile;

DETAILED DESCRIPTION INCLUDING BEST MODE

Figure 1:
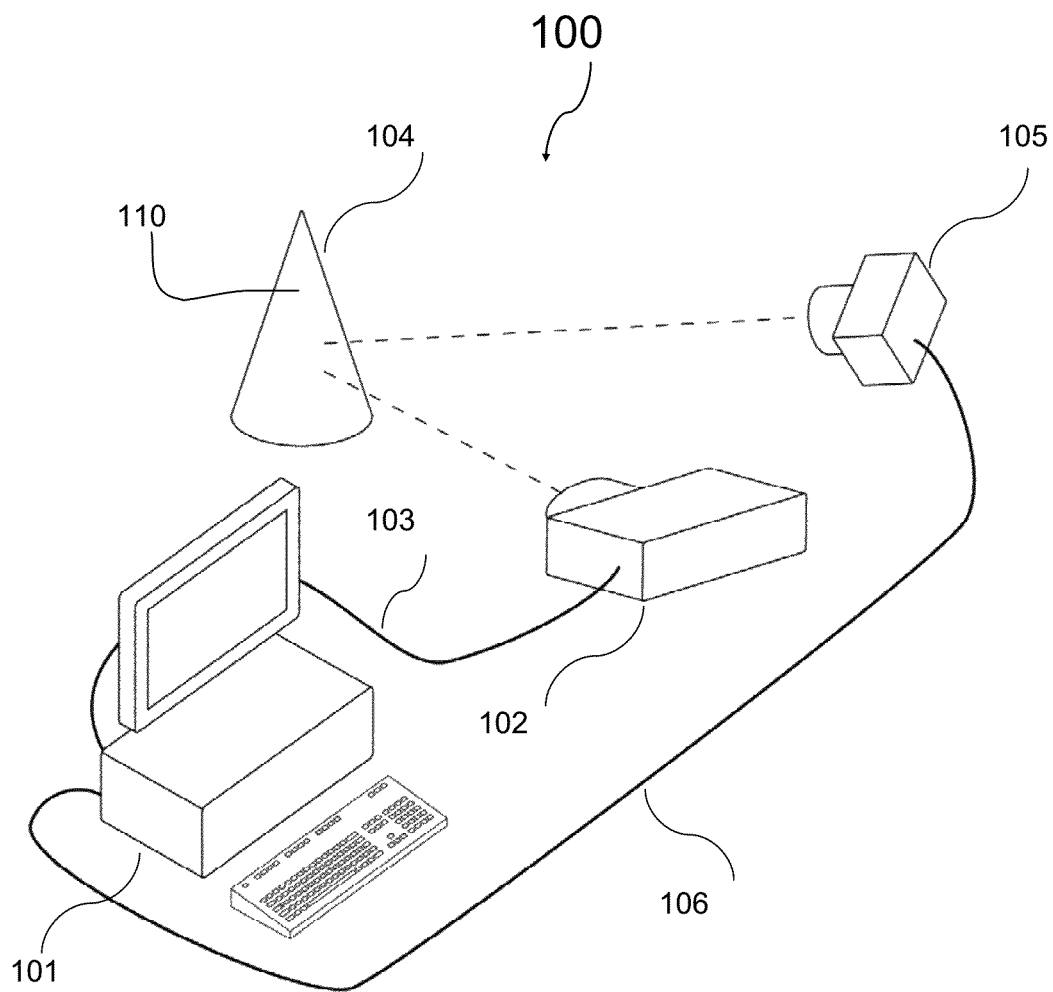
FIG. 1 shows the physical arrangement of a projector and camera system for determining the mapping between a ruler pattern coordinate space and a captured image coordinate space using a single projected code pattern (the coordinate mapping)

Disclosed are arrangements that provide a method for creating coding patterns which may be used as a 2D ruler and that can be created efficiently and support methods that permit robust recovery of the coding pattern, even in the presence of spatially variable geometric distortion and spatially variable intensity deviations in the captured coded image.

The coding patterns are based on the "2D window property" and are usually created so that no part of the pattern with the same shape and size of the defined window is repeated anywhere in the image. This condition is highly desired to ensure that the window property will provide a unique location. The pattern used in the described implementations is constructed from several bit-planes where each bit-plane is a periodic tiling of a Toroidal Binary Perfect Submap (TBPS), where the period of the tilings can be much smaller than the final image of the coding pattern. The term 'toroidal' refers to the fact that the perfect submap maintains the window property across its periodic boundary as if the pattern existed on the surface of a torus. This periodic property allows the pattern to be tiled such that the 2D-window property becomes a "periodic 2D window property" so that each window code in each bit-plane appears on a regular grid of centres rather than as an isolated occurrence. Selecting or otherwise establishing the TBPS in each bit-plane such that the least common multiple (LCM) of the submap sizes (horizontally and vertically) is larger than the size (horizontally and vertically) of the required 2D ruler ensures that the combination of window codes associated with a given location will be unique within the 2D ruler. If the sizes of the tiles are co-prime (i.e. having dimensions expressible with a pair of integers that have no common divisor other than unity, e.g. 8 and 9), then the period of the resulting ruler will be the product of the tile sizes. This provides a large K-ary toroidal perfect sub-map which maintains the "2D -window property" over a large image area yet is easily decoded.

Because the period of the individual bit-plane TBPS can be quite small (of the order of a few pixels if necessary), a pattern generated in this way provides a simple mechanism for locally identifying the grid on which the code is defined in the captured image and also allows a method for efficiently decoding the location. Within a small region around a point of interest, the geometric distortion of the captured image will often be well represented by an affine distortion. Since the input pattern in any bit-plane is known to be periodic on a rectangular grid, by identifying the origin of four or more neighbouring tiles in this grid, it is possible to accurately determine the centre points of the pixels in the pattern. This permits efficient recovery of the code around a given point, even in the presence of significant (affine) distortion and without the necessity to separately isolate the pixel boundaries in the projected pattern.

Once the pixel centres are identified, and the code recovered, the location must be determined from the code. Since the TBPS tiles in each bit-plane have a periodic binary 2D window property, the window code in each bit-plane uniquely identifies the offset of the point of interest within the TBPS tile of each bit-plane. The offset of the point of interest for the TBPS tile in each bit-plane can be determined from a set of pre-calculated hash tables which map the window code in a given bit-plane for the point of interest to the offset within the TBPS for that bit-plane. Assuming the origin of the TBPS tiles align at the origin of the coordinate system, these offsets are just the remainders with respect to division of the location coordinates by the periods in the respective bit-planes. Using the well known Chinese Remainder Theorem, the location is efficiently calculated from these remainders.

Provided the bit-planes can be accurately recovered, the method requires only a single image to be projected and captured. This allows the technique to recover high resolution depth information from dynamic scenes. Ideally, although the image may be geometrically distorted, scaling and offset variation arising from this distortion is approximately constant over one TBPS tile. However it is often the case that the surface on which the pattern is projected has variations in texture and colour which, in conjunction with spatial variations in the ambient lighting, can cause the captured image intensity to vary significantly from the ideal case. This can make accurate recovery of a K-ary code problematic as the ideal captured image intensity is affected by a spatially variable gain and offset that may vary significantly over one TBPS tile. In this situation a method is provided that creates from the coding image, using a sequential phase shifting method, a short sequence of at least three images which ensure that the code can be accurately recovered even in the presence of these spatially variable perturbations.

An exemplary physical arrangement 100 used to determine the coordinate mapping from the projector coordinates to the captured image coordinates using one or more two-dimensional (2D) ruler patterns is illustrated in FIG. 1. A computer 101 is used to create a ruler pattern which is sent to a projector 102 via a communications link 103. The projector 102 projects coded structured light in the form of a 2D ruler pattern onto a scene containing the one or more 3D objects 104 of interest. A camera 105 captures the scene including the 3D objects 104 with the projected 2D ruler from a known location and orientation relative to the projector 102. The camera 105 sends the captured image to the computer 101 via a communications link 106 for processing.

Figure 19:
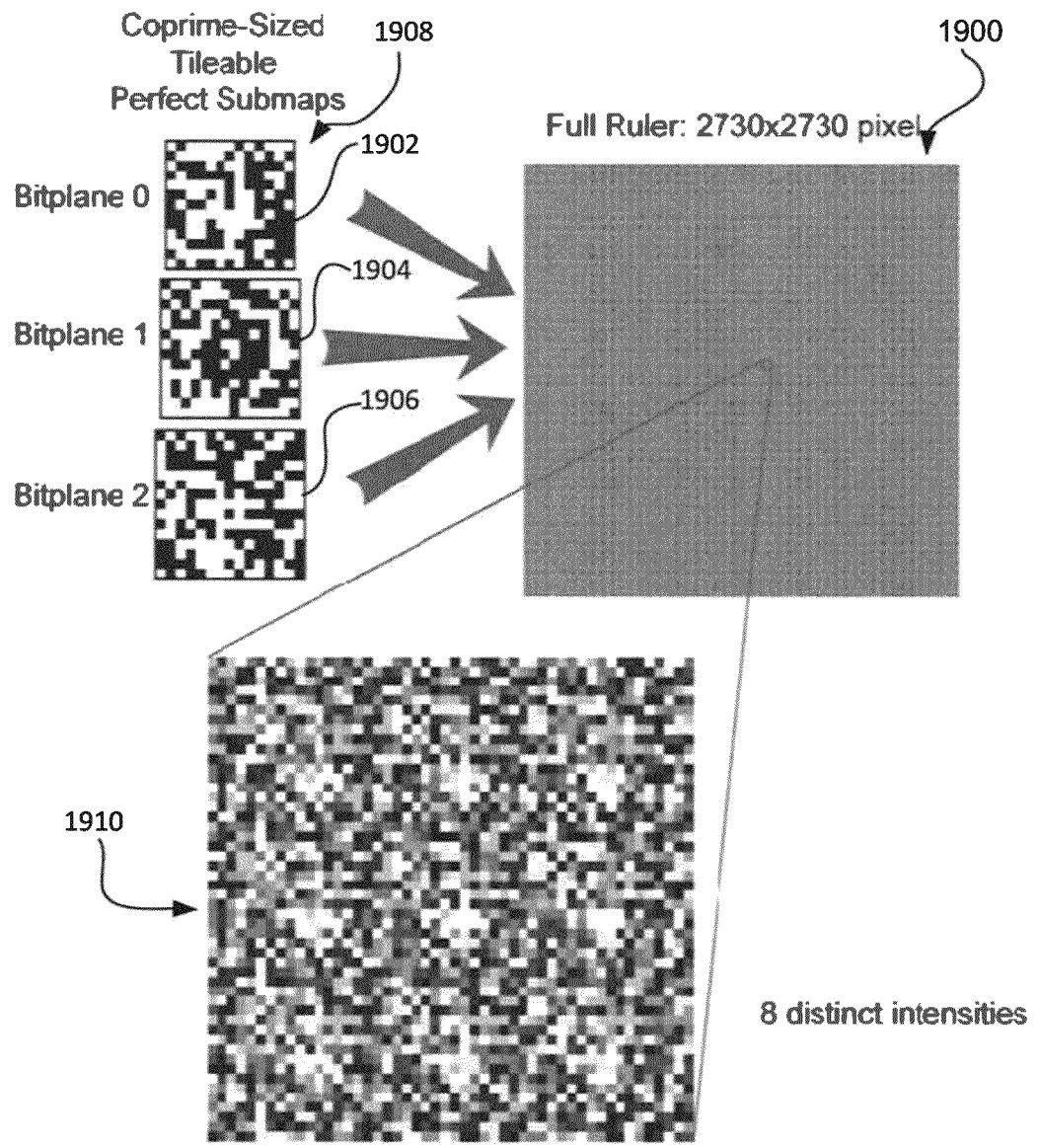
FIG. 19 illustrates an exemplary 2D ruler pattern according to the present disclosure based on Toroidal Binary Perfect Submaps.

FIG. 19 shows an exemplary 2D ruler pattern 1900 that can be used in the arrangement of FIG. 1, and which may be projected by the projector 102 onto the object 104. The pattern 1900 is described in more detail later.

Figure 20:
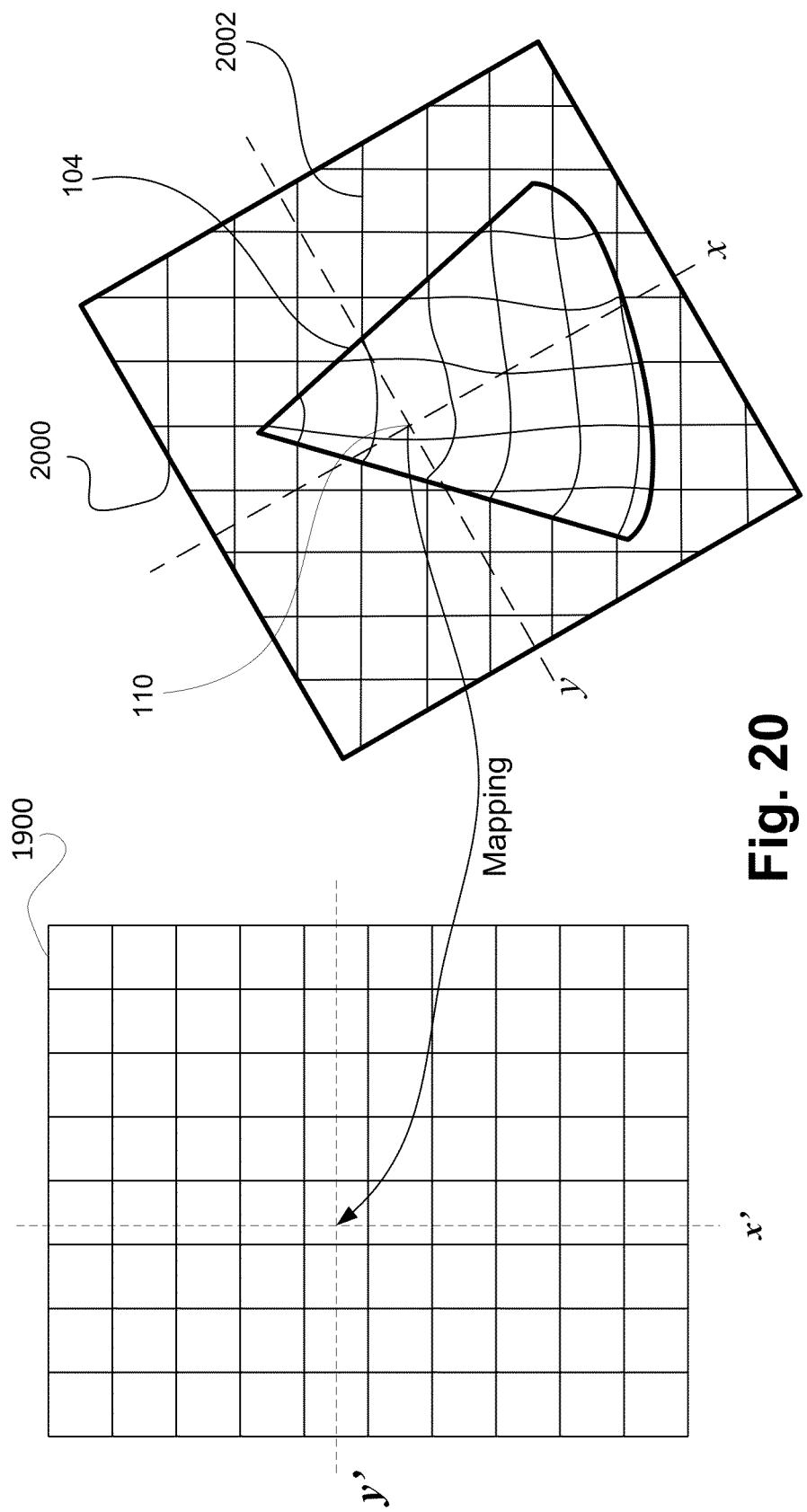
FIG. 20 is a schematic representation of an image captured in the system of FIG. 1.

FIG. 20 illustrates a schematic representation of a two-dimensional image 2000 captured by the camera 105 of the three-dimensional scene including the object 104 of FIG. 1. In FIG. 20, a grossly simplified representation 2002 of the 2D pattern (e.g. 1900) projected onto the scene by the projector 102 is also seen as part of the captured image 2000. Notably, the 3D shape 104 causes distortion of the pattern 2002 as recorded in the captured image 2000 by the camera 105. The arrangements to be described may be used to determine a two-dimensional position (x,y) in the captured image 2000 of a three-dimensional location 110 in the scene. This is done by determining a mapping between unique points known in the pattern 1900 and corresponding unique points found in the captured image 2000. This enables, amongst other processes, the mapping of the surface distortion arising from the shape 104 through determination of multiple ones of the positions (x,y). In this example, as seen in FIGS. 1 and 20, the 3D location 110 in the scene is a location on the surface of the conical object 104 approximately one-third the height of the cone down from the apex. The 2D position is simply a coordinate position in the image 2000, which maps to corresponding position (x',y') in the pattern 1900.

The arrangement of FIG. 1 is useful for measurements in a 3D environment, but the approaches disclosed herein may also be used in 2D environments, thereby permitting 2D ruler measurements. For example, the 2D pattern need not be projected onto the scene, but may be imparted onto or otherwise incorporated into the scene. Further, the scene need not be three-dimensional, but can be two-dimensional. For example, the scene may be a flat surface, such as a wall or a print medium, and the 2D pattern imparted onto the scene by means such as printing the pattern. Where the scene is formed on a print medium, the pattern may be printed directly onto the scene in the medium. Alternatively, for the wall example, the pattern may be printed onto a transparent medium, which may then be positioned on the wall for imaging by the camera 105.

Figure 18A:
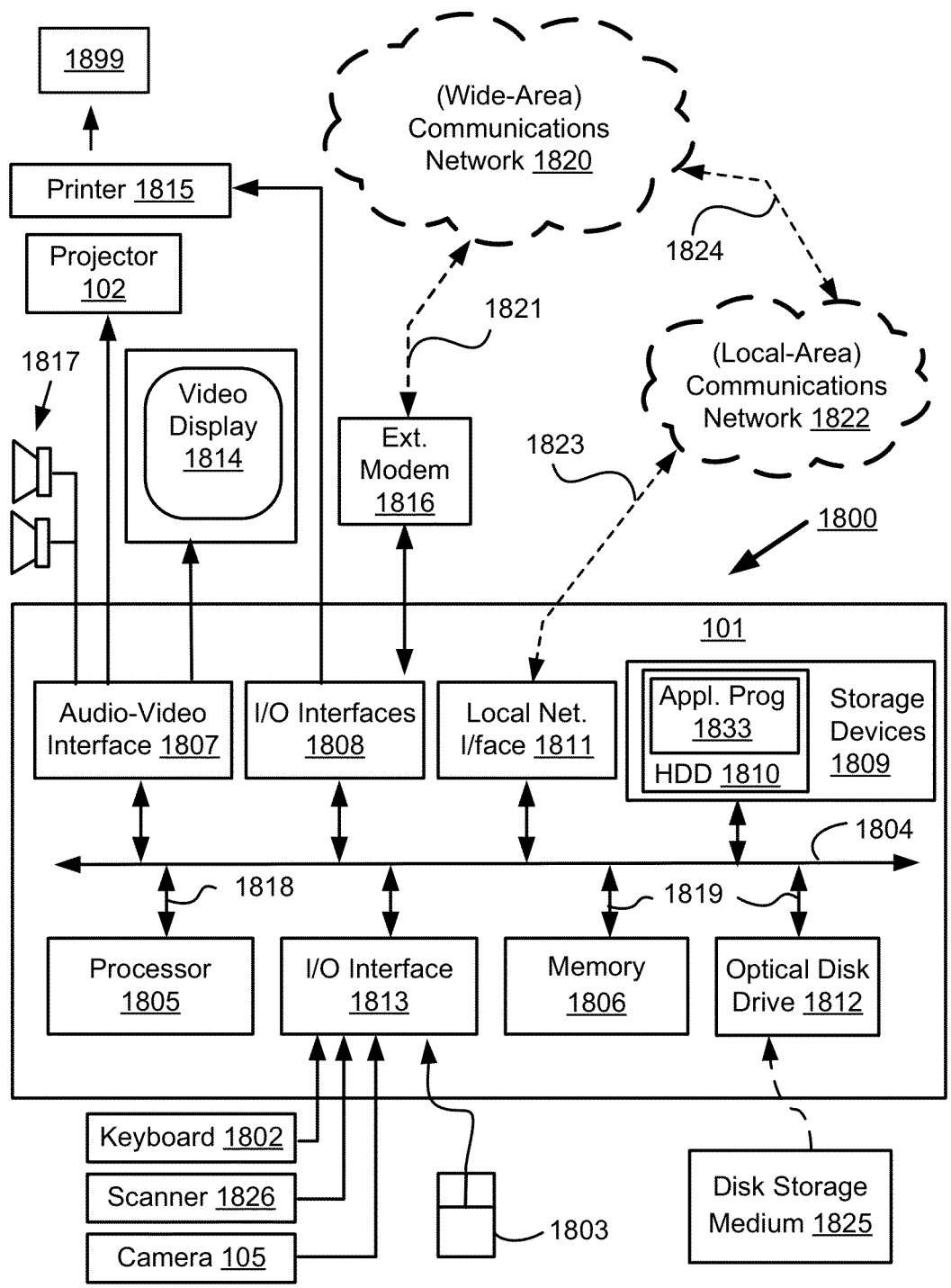
FIGS. 18A and 18B collectively form a schematic block diagram representation of an electronic device upon which described arrangements can be practised.
Figure 18B:
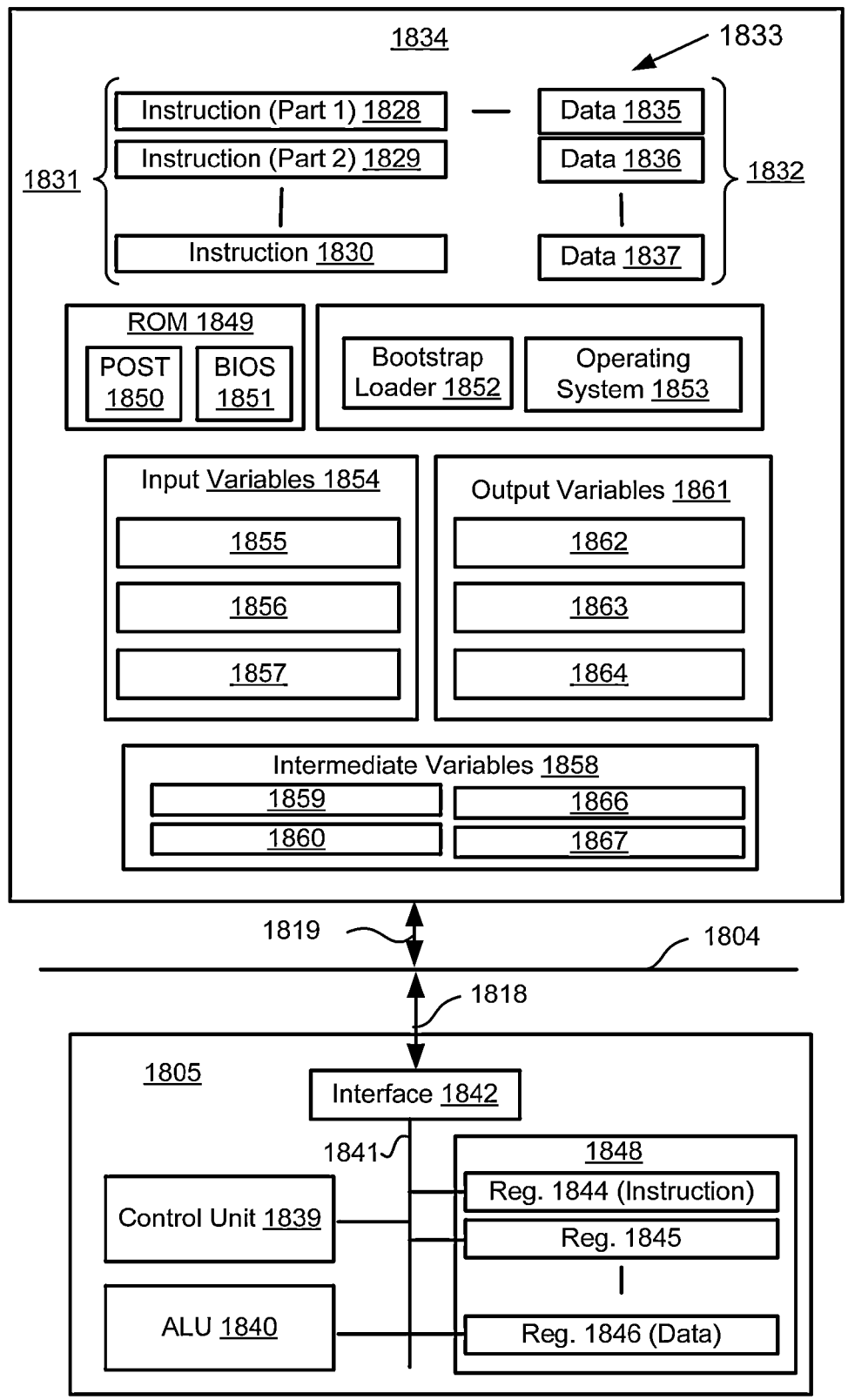

FIGS. 18A and 18B depict a general-purpose computer system 1800, upon which the various arrangements described can be practiced.

As seen in FIG. 18A, the computer system 1800 includes: the computer module 101 of FIG. 1; input devices such as a keyboard 1802, a mouse pointer device 1803, a scanner 1826, and the camera 105; and output devices including a printer 1815, a display device 1814, the projector 102 and loudspeakers 1817. An external Modulator-Demodulator (Modem) transceiver device 1816 may be used by the computer module 101 for communicating to and from a communications network 1820 via a connection 1821. The communications network 1820 may be a wide-area network (WAN), such as the Internet, a cellular telecommunications network, or a private WAN. Where the connection 1821 is a telephone line, the modem 1816 may be a traditional "dial-up" modem. Alternatively, where the connection 1821 is a high capacity (e.g., cable) connection, the modem 1816 may be a broadband modem. A wireless modem may also be used for wireless connection to the communications network 1820.

The computer module 101 typically includes at least one processor unit 1805, and a memory unit 1806. For example, the memory unit 1806 may have semiconductor random access memory (RAM) and semiconductor read only memory (ROM). The computer module 101 also includes an number of input/output (I/O) interfaces including: an audio-video interface 1807 that couples to the video display 1814, loudspeakers 1817 and projector 102; an I/0 interface 1813 that couples to the keyboard 1802, mouse 1803, scanner 1826, camera 105 and optionally a joystick or other human interface device (not illustrated); and an interface 1808 for the external modem 1816 and printer 1815. In some implementations, the modem 1816 may be incorporated within the computer module 101, for example within the interface 1808. The computer module 101 also has a local network interface 1811, which permits coupling of the computer system 1800 via a connection 1823 to a local-area communications network 1822, known as a Local Area Network (LAN). As illustrated in FIG. 18A, the local communications network 1822 may also couple to the wide network 1820 via a connection 1824, which would typically include a so-called "firewall" device or device of similar functionality. The local network interface 1811 may comprise an Ethernet™ circuit card, a Bluetooth™ wireless arrangement or an IEEE 802.11 wireless arrangement; however, numerous other types of interfaces may be practiced for the interface 1811.

The I/O interfaces 1808 and 1813 may afford either or both of serial and parallel connectivity, the former typically being implemented according to the Universal Serial Bus (USB) standards and having corresponding USB connectors (not illustrated). Storage devices 1809 are provided and typically include a hard disk drive (HDD) 1810. Other storage devices such as a floppy disk drive and a magnetic tape drive (not illustrated) may also be used. An optical disk drive 1812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1800.

The components 1805 to 1813 of the computer module 101 typically communicate via an interconnected bus 1804 and in a manner that results in a conventional mode of operation of the computer system 1800 known to those in the relevant art. For example, the processor 1805 is coupled to the system bus 1804 using a connection 1818. Likewise, the memory 1806 and optical disk drive 1812 are coupled to the system bus 1804 by connections 1819. Examples of computers on which the described arrangements can be practised include IBM-PC's and compatibles, Sun Sparcstations, Apple Mac™ or a like computer systems.

The method of coordinate mapping determination may be computer-implemented using the computer system 1800 wherein the processes of FIGS. 2 to 17, to be described, may be implemented as one or more software application programs 1833 executable within the computer system 1800. In particular, the steps of the method of coordinate mapping determination are effected by instructions 1831 (see FIG. 18B) in the software 1833 that are carried out within the computer system 1800. The software instructions 1831 may be formed as one or more code modules, each for performing one or more particular tasks. The software may also be divided into two separate parts, in which a first part and the corresponding code modules performs the mapping determination methods and a second part and the corresponding code modules manage a user interface between the first part and the user.

The software may be stored in a computer readable medium, including the storage devices described below, for example. The software is loaded into the computer system 1800 from the computer readable medium, and then executed by the computer system 1800. A computer readable medium having such software or computer program recorded on the computer readable medium is a computer program product. The use of the computer program product in the computer system 1800 preferably effects an advantageous apparatus for coordinate mapping.

The software 1833 is typically stored in the HDD 1810 or the memory 1806. The software is loaded into the computer system 1800 from a computer readable medium, and executed by the computer system 1800. Thus, for example, the software 1833 may be stored on an optically readable disk storage medium (e.g., CD-ROM) 1825 that is read by the optical disk drive 1812. A computer readable medium having such software or computer program recorded on it is a computer program product. The use of the computer program product in the computer system 1800 preferably effects an apparatus for coordinate mapping.

In some instances, the application programs 1833 may be supplied to the user encoded on one or more CD-ROMs 1825 and read via the corresponding drive 1812, or alternatively may be read by the user from the networks 1820 or 1822. Still further, the software can also be loaded into the computer system 1800 from other computer readable media. Computer readable storage media refers to any non-transitory tangible storage medium that provides recorded instructions and/or data to the computer system 1800 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 1833 and the corresponding code modules mentioned above may be executed to implement one or more graphical user interfaces (GUIs) to be rendered or otherwise represented upon the display 1814. Through manipulation of typically the keyboard 1802 and the mouse 1803, a user of the computer system 1800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1817.

FIG. 18B is a detailed schematic block diagram of the processor 1805 and a "memory" 1834. The memory 1834 represents a logical aggregation of all the memory modules (including the HDD 1809 and semiconductor memory 1806) that can be accessed by the computer module 101 in FIG. 18A.

When the computer module 101 is initially powered up, a power-on self-test (POST) program 1850 executes. The POST program 1850 is typically stored in a ROM 1849 of the semiconductor memory 1806 of FIG. 18A. A hardware device such as the ROM 1849 storing software is sometimes referred to as firmware. The POST program 1850 examines hardware within the computer module 101 to ensure proper functioning and typically checks the processor 1805, the memory 1834 (1809, 1806), and a basic input-output systems software (BIOS) module 1851, also typically stored in the ROM 1849, for correct operation. Once the POST program 1850 has run successfully, the BIOS 1851 activates the hard disk drive 1810 of FIG. 18A. Activation of the hard disk drive 1810 causes a bootstrap loader program 1852 that is resident on the hard disk drive 1810 to execute via the processor 1805. This loads an operating system 1853 into the RAM memory 1806, upon which the operating system 1853 commences operation. The operating system 1853 is a system level application, executable by the processor 1805, to fulfil various high level functions, including processor management, memory management, device management, storage management, software application interface, and generic user interface.

The operating system 1853 manages the memory 1834 (1809, 1806) to ensure that each process or application running on the computer module 101 has sufficient memory in which to execute without colliding with memory allocated to another process. Furthermore, the different types of memory available in the system 1800 of FIG. 18A must be used properly so that each process can run effectively. Accordingly, the aggregated memory 1834 is not intended to illustrate how particular segments of memory are allocated (unless otherwise stated), but rather to provide a general view of the memory accessible by the computer system 1800 and how such is used.

As shown in FIG. 18B, the processor 1805 includes a number of functional modules including a control unit 1839, an arithmetic logic unit (ALU) 1840, and a local or internal memory 1848, sometimes called a cache memory. The cache memory 1848 typically includes a number of storage registers 1844-1846 in a register section. One or more internal busses 1841 functionally interconnect these functional modules. The processor 1805 typically also has one or more interfaces 1842 for communicating with external devices via the system bus 1804, using a connection 1818. The memory 1834 is coupled to the bus 1804 using a connection 1819.

The application program 1833 includes a sequence of instructions 1831 that may include conditional branch and loop instructions. The program 1833 may also include data 1832 which is used in execution of the program 1833. The instructions 1831 and the data 1832 are stored in memory locations 1828, 1829, 1830 and 1835, 1836, 1837, respectively. Depending upon the relative size of the instructions 1831 and the memory locations 1828-1830, a particular instruction may be stored in a single memory location as depicted by the instruction shown in the memory location 1830. Alternately, an instruction may be segmented into a number of parts each of which is stored in a separate memory location, as depicted by the instruction segments shown in the memory locations 1828 and 1829.

In general, the processor 1805 is given a set of instructions which are executed therein. The processor 1105 waits for a subsequent input, to which the processor 1805 reacts to by executing another set of instructions. Each input may be provided from one or more of a number of sources, including data generated by one or more of the input devices 1802, 1803, data received from an external source across one of the networks 1820, 1802, data retrieved from one of the storage devices 1806, 1809 or data retrieved from a storage medium 1825 inserted into the corresponding reader 1812, all depicted in FIG. 18A. The execution of a set of the instructions may in some cases result in output of data. Execution may also involve storing data or variables to the memory 1834.

The disclosed coordinate mapping arrangements use input variables 1854, which are stored in the memory 1834 in corresponding memory locations 1855, 1856, 1857. The coordinate mapping arrangements produce output variables 1861, which are stored in the memory 1834 in corresponding memory locations 1862, 1863, 1864. Intermediate variables 1858 may be stored in memory locations 1859, 1860, 1866 and 1867.

Referring to the processor 1805 of FIG. 18B, the registers 1844, 1845, 1846, the arithmetic logic unit (ALU) 1840, and the control unit 1839 work together to perform sequences of micro-operations needed to perform "fetch, decode, and execute" cycles for every instruction in the instruction set making up the program 1833. Each fetch, decode, and execute cycle comprises:

(a) a fetch operation, which fetches or reads an instruction 1831 from a memory location 1828, 1829, 1830;

(b) a decode operation in which the control unit 1839 determines which instruction has been fetched; and (c) an execute operation in which the control unit 1839 and/or the ALU 1840 execute the instruction.

Thereafter, a further fetch, decode, and execute cycle for the next instruction may be executed. Similarly, a store cycle may be performed by which the control unit 1839 stores or writes a value to a memory location 1832.

Each step or sub-process in the processes of FIGS. 2 to 17 is associated with one or more segments of the program 1833 and is performed by the register section 1844, 1845, 1847, the ALU 1840, and the control unit 1839 in the processor 1805 working together to perform the fetch, decode, and execute cycles for every instruction in the instruction set for the noted segments of the program 1833.

Figure 2A:
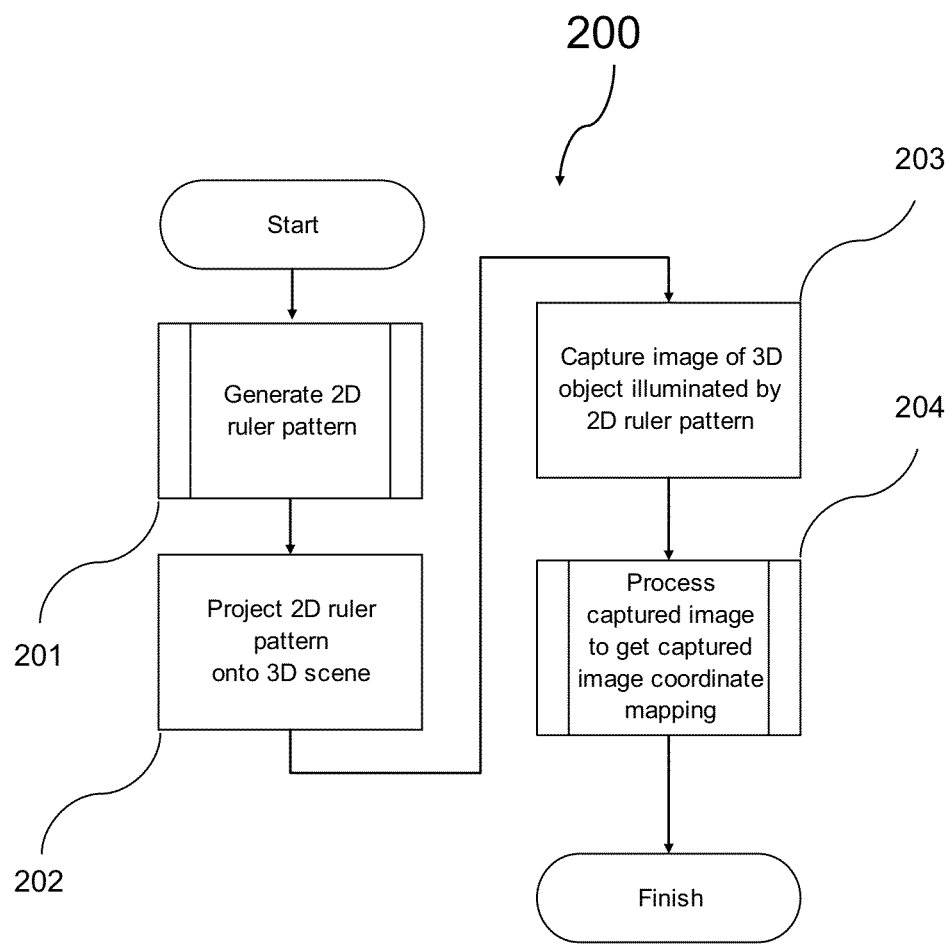
FIG. 2A is a schematic flow diagram illustrating a first procedure for determining the coordinate mapping.

An overall process 200 used to determine the coordinate mapping using a single 2D ruler pattern is illustrated in FIG. 2A. First the 2D ruler pattern (e.g. 1900) is generated 201 within the computer module 101, then that ruler pattern is projected 202 onto the 3D scene 104 using the projector 102. An image of the scene with the projected ruler pattern is captured 203 using the camera 105 and sent to the computer 101 via the communications link 106. The captured image is then processed 204 on the computer 101 to return the coordinate mapping, being a 2D position in an image of a location in the 3D scene as captured by the camera 105.

Figure 2B:
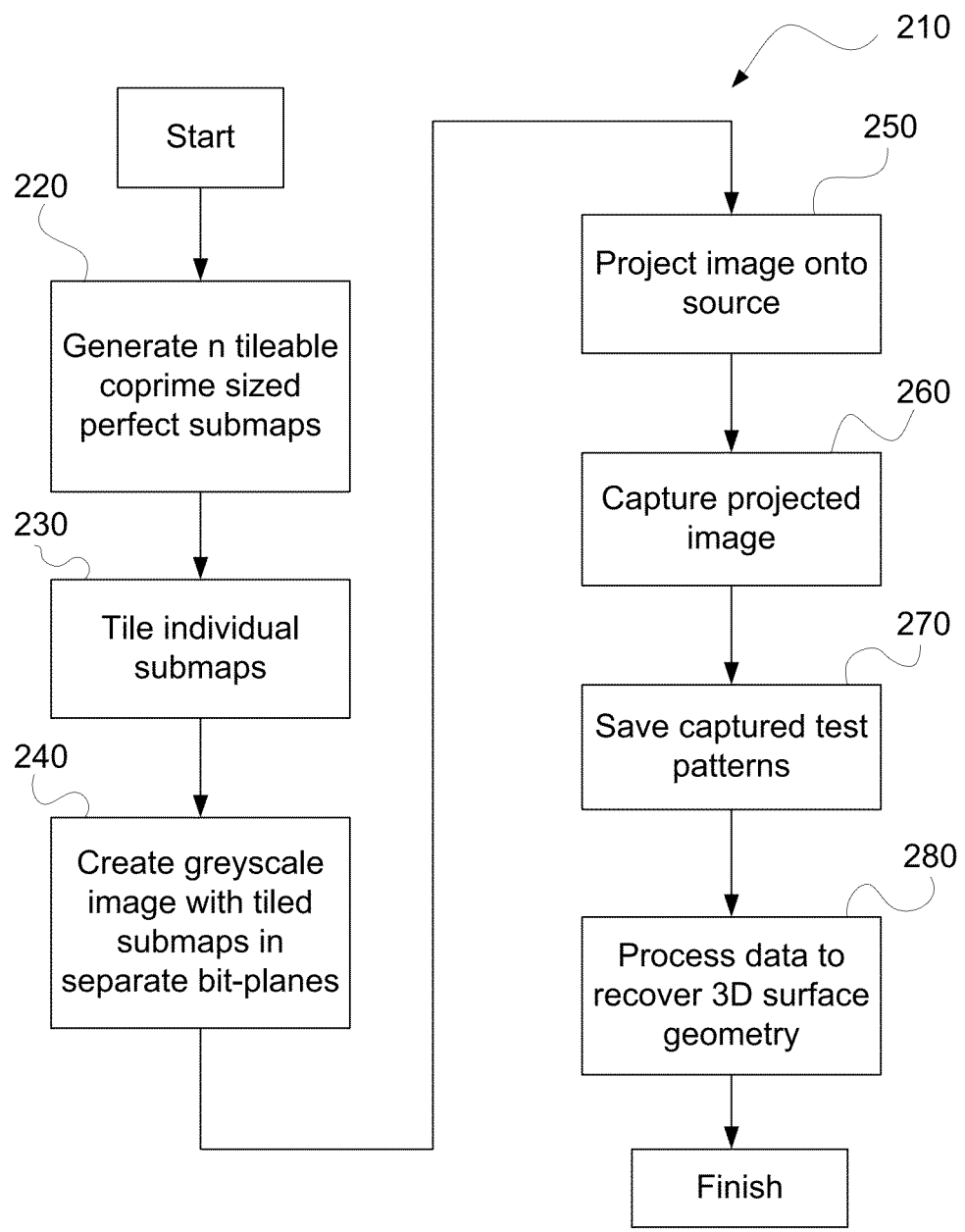
FIG. 2B is a schematic flow diagram of a second, more detailed procedure for determining a coordinate mapping.

FIG. 2B shows further detail of a process 210 where the computer 101 initially in step 220 generates n tileable co-prime sized perfect submaps. In step 230 the individual submaps are tiled in corresponding bit-planes and step 240 creates a greyscale image with the tiled submaps over the various bit-planes. The greyscale image is then projected in step 250 onto a surface and in step 260 an image of the projection is captured, which is saved or stored in the computer 101 in step 270 as a captured test pattern. Lastly, in step 280 the data of the saved test pattern is processed to recover the 3D geometry of the surface.

Figure 3:
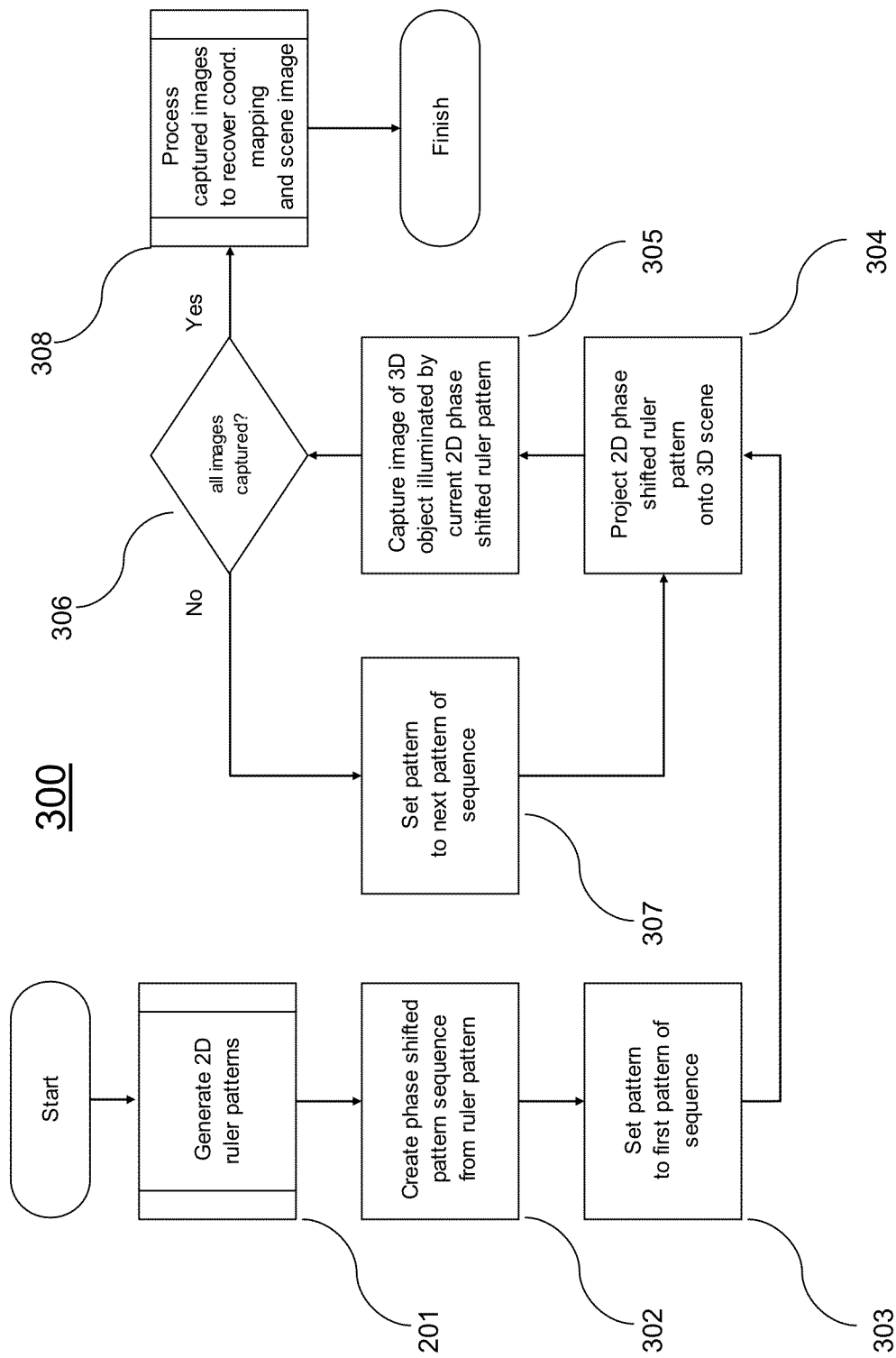
FIG. 3 is a schematic flow diagram illustrating a procedure for determining the mapping between the ruler pattern coordinate space and the captured image coordinate space using a sequence of phase shifted images generated from a code pattern image.

The process 200 of FIG. 2A and the process 210 of FIG. 2B are applicable to both static and dynamic scenes since only one pattern is required to capture the coordinate mapping. However, if the scene has spatially variable reflectivity with features of the order of the resolution of the pattern, this can greatly complicate the processing required to capture the depth information. For scenes where the object does not move significantly in the time required to acquire a small number (at least three) images, it is possible to use the 2D ruler pattern to construct a set of phase shifted ruler patterns that allow both the depth and a traditional scene image to be captured. The set preferably includes at least three ruler patterns. A process 300 used to determine the coordinate mapping and a traditional image of the scene, using a short series of phase shifted 2D ruler patterns, is illustrated in FIG. 3.

The 2D Ruler pattern is generated in step 201. The 2D ruler pattern is then used to create a series of 2D phase shifted ruler patterns in step 302. A first pattern of the series is selected in step 303 and projected at step 304 onto the scene 104 using the projector 102. An image of the scene with the projected ruler pattern is captured at step 305 using the camera 105 and sent to the computer 101 via the communications link 106. If there are more phase shifted ruler patterns to use, as determined at step 306, then the next pattern is selected at step 307 and projected 304 to produce a further captured image at step 305. When all ruler patterns in the sequence have been projected and the resulting images captured, the sequence of captured images is processed at step 308 on the computer 101 to return the coordinate mapping and scene image.

Prior to discussing the process 201 for generation of the ruler pattern, the basic features of the exemplary pattern 1900 of FIG. 19 are best described. The pattern 1900 is formed by a confluence of bit-plane patterns, each bit-plane pattern being formed by a 2D tiling of a corresponding perfect submap pattern 1908. In the example of FIG. 19 there are three bit-planes each formed from a corresponding differently sized perfect submap pattern 1902, 1904 and 1906. The submaps 1902, 1904 and 1906 in this example are co-prime, where the submap 1902 has a size of 13×13 pixels, the submap 1904 has a size of 14×14 pixels and the submap 1906 has a size of 15×15 pixels. An LCM tiling of the co-prime submaps give an overall dimension of the pattern 1900 of (13×14×15)×(13×14×15)=2730×2730 pixels. The three bit-planes 1902-1906 combine to give eight greyscale image intensities available for pixels in the pattern 1900, as depicted in the exemplary portion 1910 in FIG. 19. The effect of using the perfect submaps in this fashion is that, for a small group of pixels (in this case a 3×3 pixel block), there are no repetitions in the pattern and thus each pixel location in the pattern may be uniquely resolved.

Considering the pattern 1900 more generally, each bit-plane is formed of a non-overlapping periodic repetition of a binary block (i.e. a tiling of the binary block), such that for each of the dimensions of the tiled binary blocks, the least common multiple of each of the sizes of the tiled binary blocks in that dimension is greater than the size of the pattern in the same dimension and such that any binary sub-block of a predetermined size less than the tiled binary blocks occurs only on a regular grid with the same periodicity as the tiled binary block for that bit-plane. This permits the tilings to be performed using sizes that are not co-prime, provided the overall pattern is sized to preclude ambiguity. Once formed, the pattern may itself be tiled, and ambiguities arising from such implementations would generally be readily resolvable due to the significant displacement of unique locations in each tile.

Figure 4:
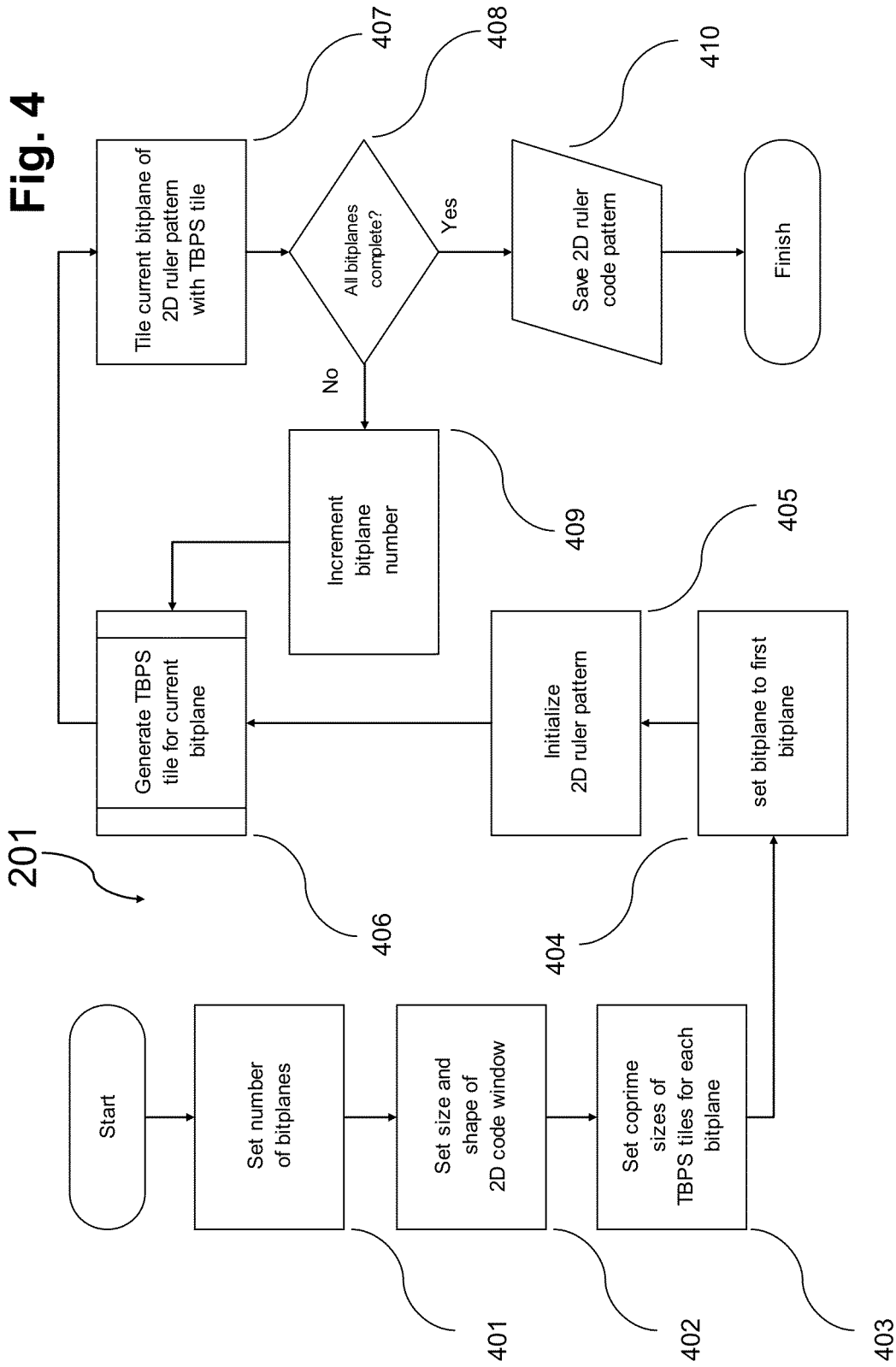
FIG. 4 is a schematic flow diagram illustrating a procedure for creating a 2D ruler code pattern.

Detail of an example of the process 201 for creating the 2D ruler pattern, used in the processes 200 and 300 is illustrated in FIG. 4. First, a number of bit-planes to be used for encoding is set at step 401. Next the size and shape of a 2D code window is set in step 402. A 2D code window is used to identify a unique collection of adjacent pixels in the pattern, and thus the captured image, to thereby permit identification of a particular pixel location in the image and ruler pattern, from which a geometric depth may then be determined. The code window needs to be large enough to code more than the number of points in the 2D ruler pattern. If there are M points in the 2D ruler pattern and each point takes one of $K=2^N$ possible values, where N is the number of bit-planes, then the number of pixels in the 2D code window must be strictly greater than $\log_K(M)=\log_2(M)/N$. In the specific implementations described herein, a code window size of 3×3=9 pixels is used (see 1603 in FIG. 16, to be described). With reference to FIG. 19, N=3, M=(2730×2730)=7452900, and therefore (9>$\log_2$(7452900)/3).

The shape of the code window can be rectangular, square, or any pattern of contiguous or non-contiguous pixels. For the present particular implementation, the code window is a square arrangement of 9 pixels, as seen for example in FIG. 21A, thereby affording convenient periodicity. The code window can be any shape, and does not have to be tileable. However, having a code window that is so large that the code window overlaps with periodic copies of itself is undesirable as such decreases the number of effective bits in the code window. FIGS. 21B-21D show some alternate arrangements for code windows that may be used. Note that the code window shape does not determine the size of the ruler, which is determined by the tile sizes. A more compact shape will result in fewer problems with loss of points (due to occlusion for example). The size of the code window determines the maximum size of the TBPS (which will be achieved when the TBPS is actually a perfect map—i.e. all possible codes are present for exactly one location in the TBPS). The larger the window code, the less codes are used in the pattern, which increases the robustness to errors in the capture and analysis process.

Next, in step 403, the size of the binary tiles used to construct the bit-planes is set. The tiles should have more points than the code window, and the code window shape should desirably not share ruler grid points with periodic copies of itself on a period of the tile size. This feature is desirable because the size of the window should be as small as possible to provide a unique code for each location in the pattern—allowing for some redundancy to provide robustness. If the code window shares ruler grid points with periodic copies of itself then the number of possible unique codes is reduced relative to a code window of the same size that does not share ruler grid points with periodic copies of itself. The size of each tile must be such that for each dimension, the LCM of the tile sizes is larger than the size of the 2D-ruler. This predicates that the tiles sizes for each bit-plane are co-prime in order to maximize the size of the pattern whilst avoiding potential ambiguity.

The first bit-plane is selected at step 404 and the 2D ruler pattern is initialised at step 405. A TBPS tile for the current bit-plane is created in step 406 and used to tile the current bit-plane of the 2D ruler in step 407. If there are more bit-planes remaining to be generated, as tested in step 408, then the next bit-plane is selected at step 409 and the processing continues from step 406 as before. If there are no more bit-planes to complete, as determined at step 408, then the 2D ruler is saved by the processor 1805 to the memory 1806 or 1810 in step 410 and the processing terminates.

Not all of the tiles for each bit-plane need be a perfect submap—some may be perfect maps. However, if the tiles of two or more bit-planes are perfect maps then the areas of those tiles would need to be the same which would limit the size of the 2D ruler as the dimensions of the TBPS tiles could then not be co-prime. The maximum horizontal 2D ruler size is achieved when the horizontal sizes of the TBPS tiles for each bit-plane are co-prime. Similarly, the maximum vertical 2D ruler size is achieved when the vertical sizes of the TBPS tiles for each bit-plane are co-prime. Optimum implementation occurs when the tiles are co-prime perfect submaps and the bit-planes are sized based on the LCM of the tile dimensions.

Figure 5:
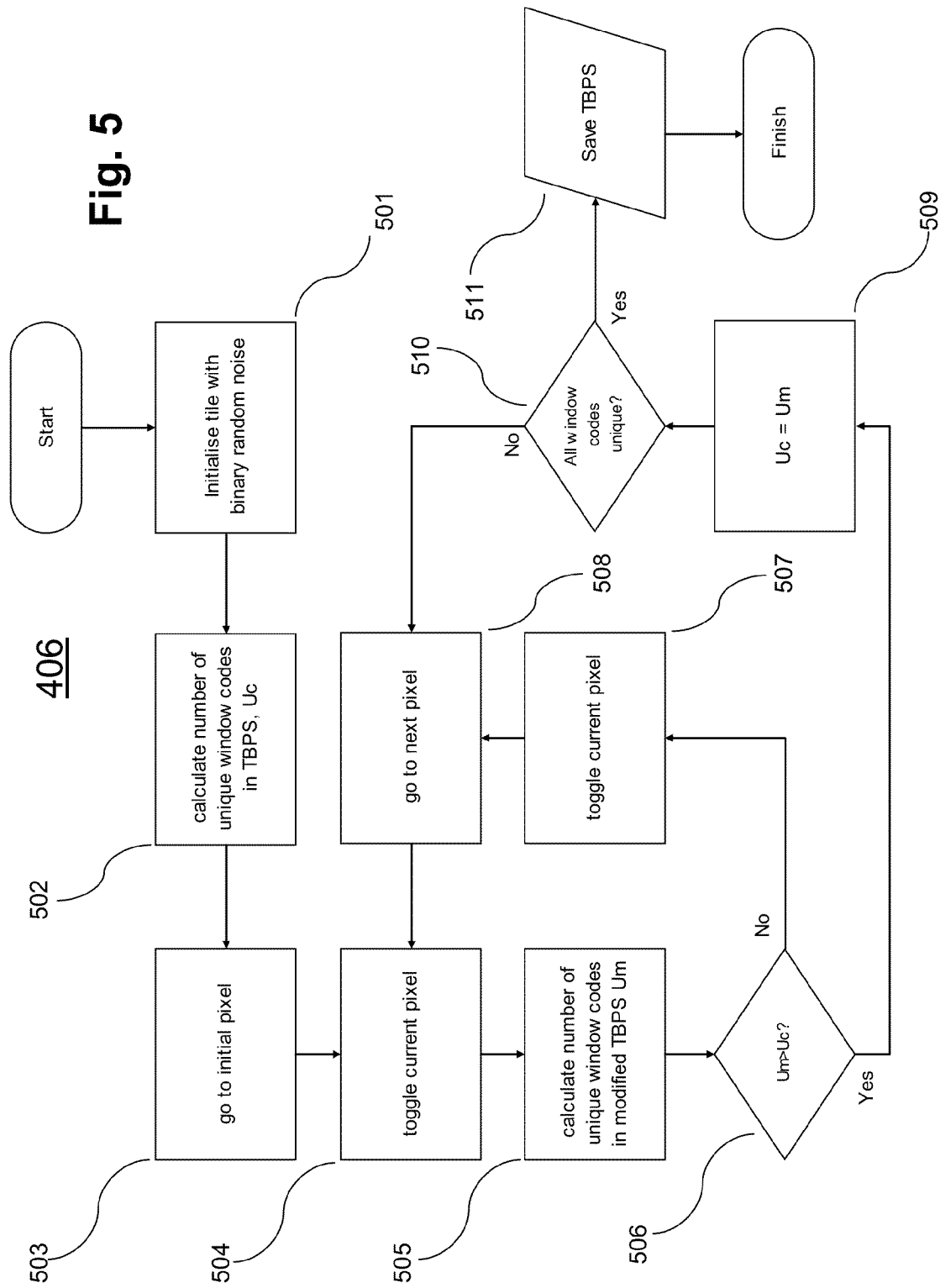
FIG. 5 is a schematic flow diagram illustrating a procedure for creating a Toroidal Binary Perfect Submap (TBPS)

Morano described a brute force algorithm for generating perfect submaps. This can be used to create TBPS tiles. Step 406, as described in detail in FIG. 5, uses another, iterative approach, to create a TBPS of a required tile size, and for a chosen code window shape As seen in FIG. 5, the tile is first initialised in step 501 with binary random noise. The number of window codes that occur exactly once in the tile is determined and assigned to the current uniqueness measure $U_c$ 502. The current pixel is set to a first pixel in the tile in step 503. That pixel is toggled in step 504 and the number of window codes that occur in the now modified tile exactly once is calculated and assigned to the modified uniqueness measure $U_m$ in step 505. If $U_m$ is not greater than the current uniqueness measure $U_c$ as tested in step 506, then the current pixel is toggled in step 507 to return the current pixel to its original state, and the next pixel in the tile is selected at step 508. However, if at step 506 the modified current uniqueness measure $U_m$ is greater than the current uniqueness measure $U_c$ then the current uniqueness measure is made equal to the modified uniqueness measure at step 509. Provided the number of unique window codes is less than the number of pixels in the tile, as tested in step 510, the process 406 selects the next pixel at step 508 and continues to step 504. However, if at step 510 all window codes in the tile are now unique, then the process 406 saves the TBPS tile at step 511 to the memory 1806, 1810 and the process 406 exits.

In order to permit efficient decoding of the tiles, it is desirable to be able to quickly look up the offsets in each tile, given the code window. The "offset" is that unique position within a tile at which the code window may be positioned to permit identification of any particular pixel in the tile. Examples of offsets are seen in FIG. 22 for a 13×13 tile 2200 which has a local origin location 2202. Three exemplary 3×3 code windows 2204, 2206 and 2208 are shown at various locations within the tile 2200. Associated with each code window 2204, 2206 and 2208 is a corresponding offset 2210, 2212 and 2214 extending as a 2D vector from the tile origin 2202 to a corresponding origin location (unlabelled for clarity) of the corresponding code widow 2204, 2206 and 2208. The offsets permit unique identification of a position of a code window with the tile, and hence, via the code window, the unique identification of a pixel value.

Figure 6:
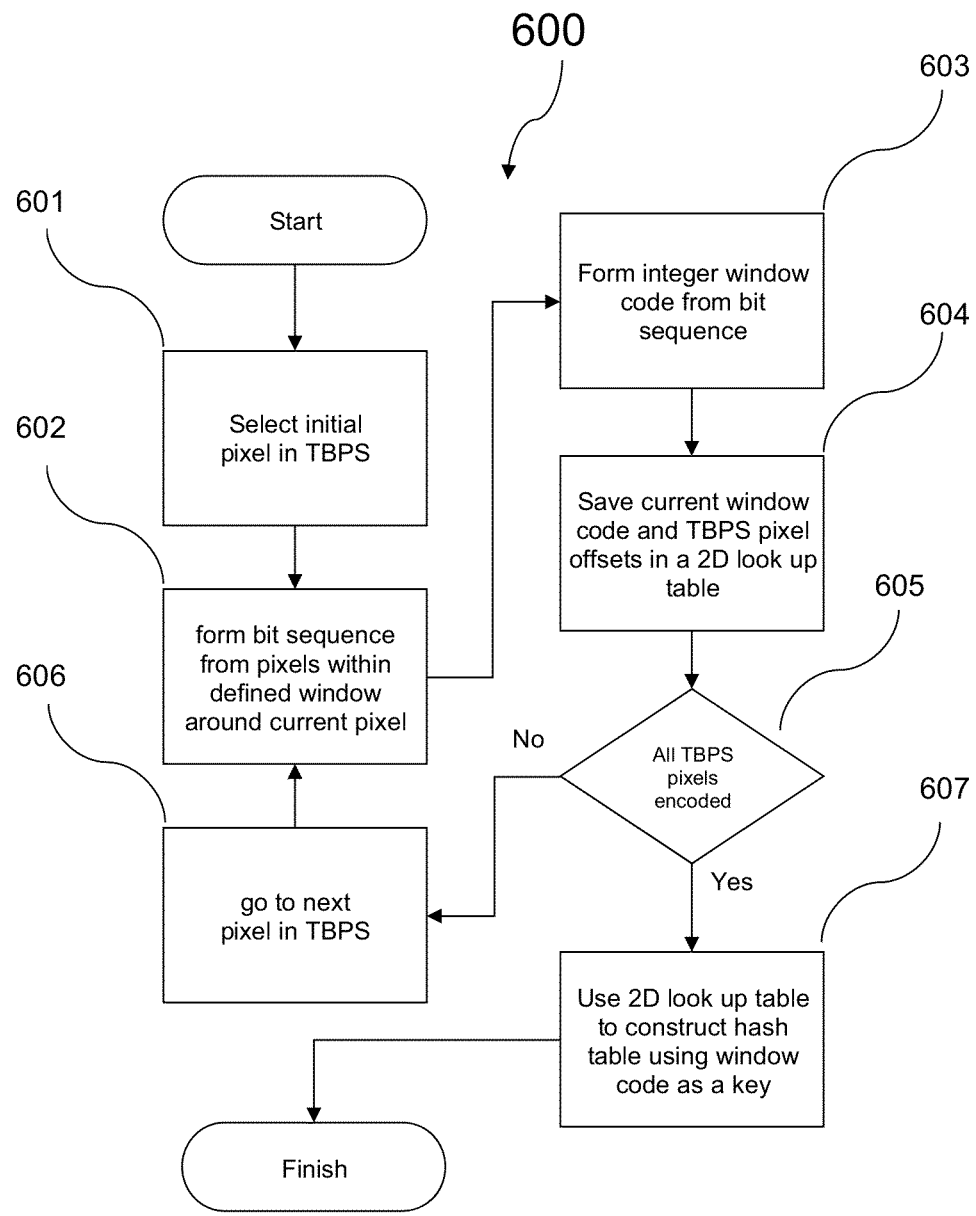
FIG. 6 is a schematic flow diagram illustrating a procedure for creating a hash table for decoding the location in a TBPS from the local window code.

The procedure in FIG. 6 shows a method 600 for constructing a table that can be used to efficiently access the offsets. The method 600 is performed associated with the generation of the TBPS, either as a precursor step of, or after, TBPS generation, but is desirably performed before projection of the pattern onto the target. The method 600 is desirably implemented as software executable by the processor 1805 of the computer 101. Given a TBPS and a corresponding coding window, step 601 selects an initial pixel 601 within the TBPS. Step 602 then forms a bit sequence from a predetermined ordering of the pixels within the defined coding window. The bit sequence is converted into an integer window code in step 603. This process of extraction of the window code performed in steps 601-603 is further illustrated 1600 in FIG. 16 where a TBPS tile 1601 is shown with the current selected pixel indicated by a cross 1602. The defined coding window 1603 is highlighted to show the (9 pixel) points within the window 1603.

The window code $W_{i,j,n}$ for the pixel in the $n^{th}$ bitplane at index position (i,j) in the captured image can be represented mathematically as $$W_{i,j,n} = \sum_w b_{i-I(w),j-J(w),n} 2^w. \quad (1)$$

where $b_{i-I(w),j-J(w),n}$ is the bit value at the $w^{th}$ code-window location which his offset from the pixel (i,j) by offsets of (I(w), J(w)) 1605.

The window code is saved by the processor 1805 in a 2D look up table in the memory 1806/1810 with the address of the current pixel 604. For example, a bit sequence for the window 1603, using a right to left, top to bottom raster sequence (illustrated by the window location indices 1604), and commencing at the top left pixel of the window 1603, would be $111010000_2$ (with black pixels taking the value 0 and white pixels taking the value 1), giving an integer window code of $464_{10}$.

Returning to FIG. 6, step 605 tests if all pixels in the TBPS tile have been encoded and saved in the 2D look-up table. If not, step 606 follows where the next pixel in the TBPS tile is selected and steps 602 to 604 are repeated. When all pixels have had their window code saved at step 605, the processor 1805 in step 607 then uses the 2D look up table to construct a hash table to invert the look up table. The hash table may also be saved by the processor 1805 in the memory 1806/1810. This concludes the method 600. This hash table, when given an input of the window code from a location in the TBPS, returns the 2D pixel offsets in the tile. Methods for constructing a minimal perfect hash function when the keys for the hash and the results of the hash function are determined in advance (as they are here) are well known and available in standard software libraries.

The methods and processes of FIGS. 4 to 6 provide for the generation of the pattern 1900. As noted above the pattern 1900 may be generated by the computer 101 executing the method of FIGS. 4 to 6 and directly output as a displayable image to the projector 102 for projection onto the scene or target 104. The pattern 1900, as part of the generation, is stored to the computer memory 1806/1810 for subsequent or repeated use. In some implementations, the pattern 1900 may be recorded as image data to a non-volatile non-transitory recording medium, such as a CD-ROM or USB memory or the other formats mentioned above, for distribution or use by one or more projectors 102. Another non-transitory non-volatile medium to which the pattern 1900 may be recorded is to that of a slide 1899 which is generally translucent but colloquially may be termed a "transparent" slide. Such recording may be performed by printing using an appropriately configured printer 1815, or using photographic exposure techniques. The slide 1899 may then be inserted into the projector 102 for projection of the pattern image onto the scene.

Figure 7:
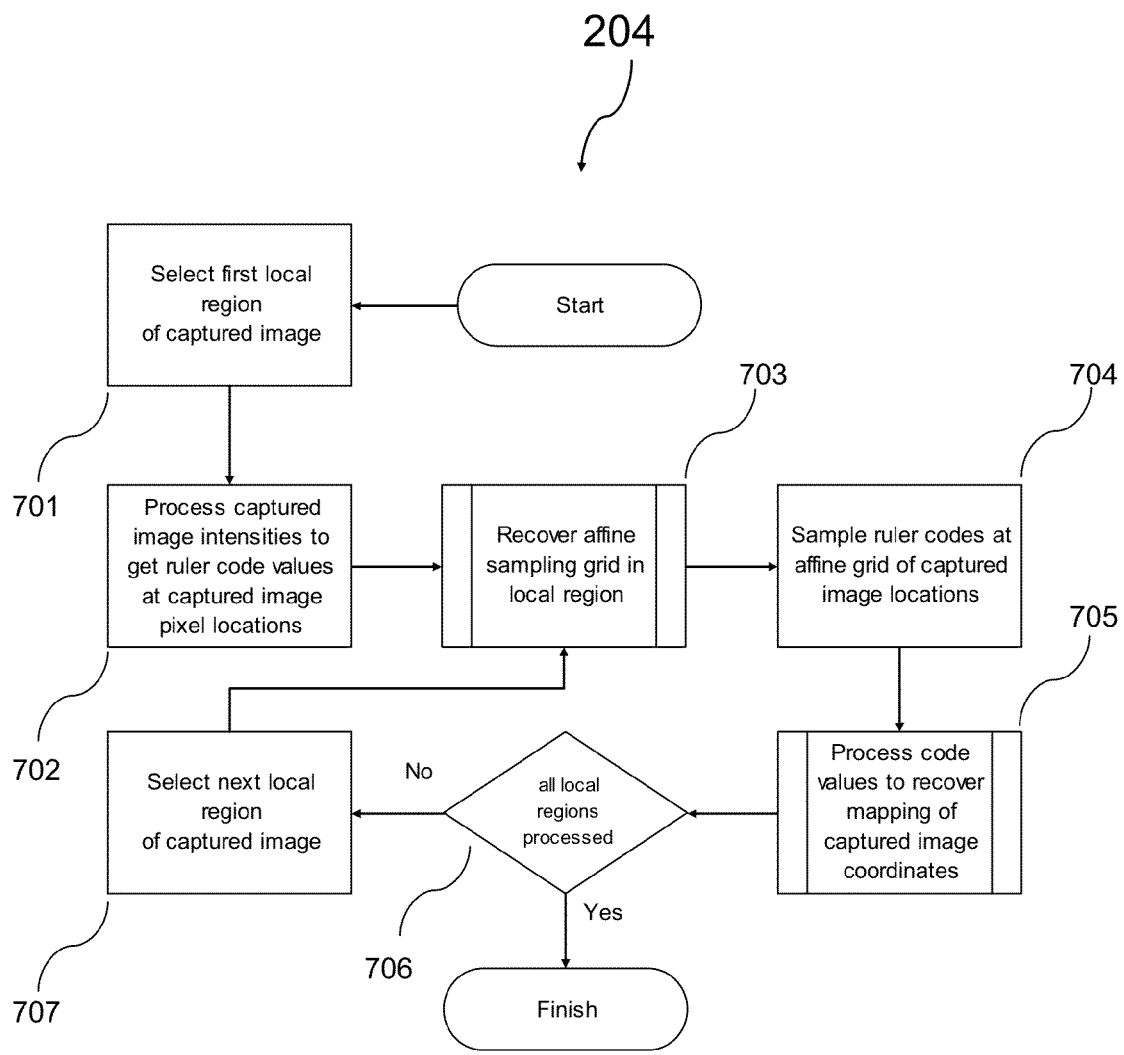
FIG. 7 is a schematic flow diagram illustrating a procedure for processing the captured image of a scene on which a 2D Ruler Pattern has been projected, to recover the coordinate mapping.

FIG. 7 illustrates the process 204 for generating a mapping of the captured image coordinates to the coordinate system of the 213 ruler pattern when a single 2D ruler pattern is projected onto the scene, such as illustrated for example in FIG. 20. Given the single captured image, the process 204 first selects in step 701 a local subregion of the image that contains at least four full periods or tilings of the TBPS in at least one of the bit-planes of the ruler pattern and at least one full period in each of the other bit-planes. The ruler code values are then recovered in step 702 at the each of the captured image pixels. In the simplest form this assumes that the gain and offset in the captured image are locally spatially invariant, meaning in the present example that the 8 intensity levels within the local sub-region are distinguishable regardless of their overall intensity. A histogram analysis of the intensity values in the local region can be used to establish the discrete intensities corresponding to the code values. This establishes a mapping from the intensity values to the 2D ruler code values. A process 703 (detailed in FIG. 9) is then used to establish an affine grid corresponding to the centres of the pixels of the projected 2D ruler pattern within the selected local region. The ruler codes at intersection points of the affine grid in the captured image are then sampled in step 704. This may involve simply sampling the nearest image point or taking a median value within a region smaller than one cell of the affine grid to minimise the effects of noise. The affine grid of sampled codes will therefore correspond to an equivalent set of points in the 2D ruler pattern. The recovered sampled code values are then processed in step 705 to decode and thereby determine the 2D ruler coordinates corresponding to the sampled affine grid points.

Since the grid points correspond to pixels in the 2D ruler pattern, the captured image coordinates at the grid points can be stored in an array of the same dimensions as the 2D ruler to provide a map from 2D ruler coordinates to captured image coordinates. If multiple local regions return different captured image coordinates for the same 2D ruler coordinate, these can be averaged to reduce the variation due to noise. If there are more local regions in the captured image that remain to be processed, as tested in step 706, then the process 204 selects the next local region in step 707 and returns to step 703 for processing that selected region. When all local regions have been processed, as determined in step 706, then the process 204 terminates.

Figure 8:
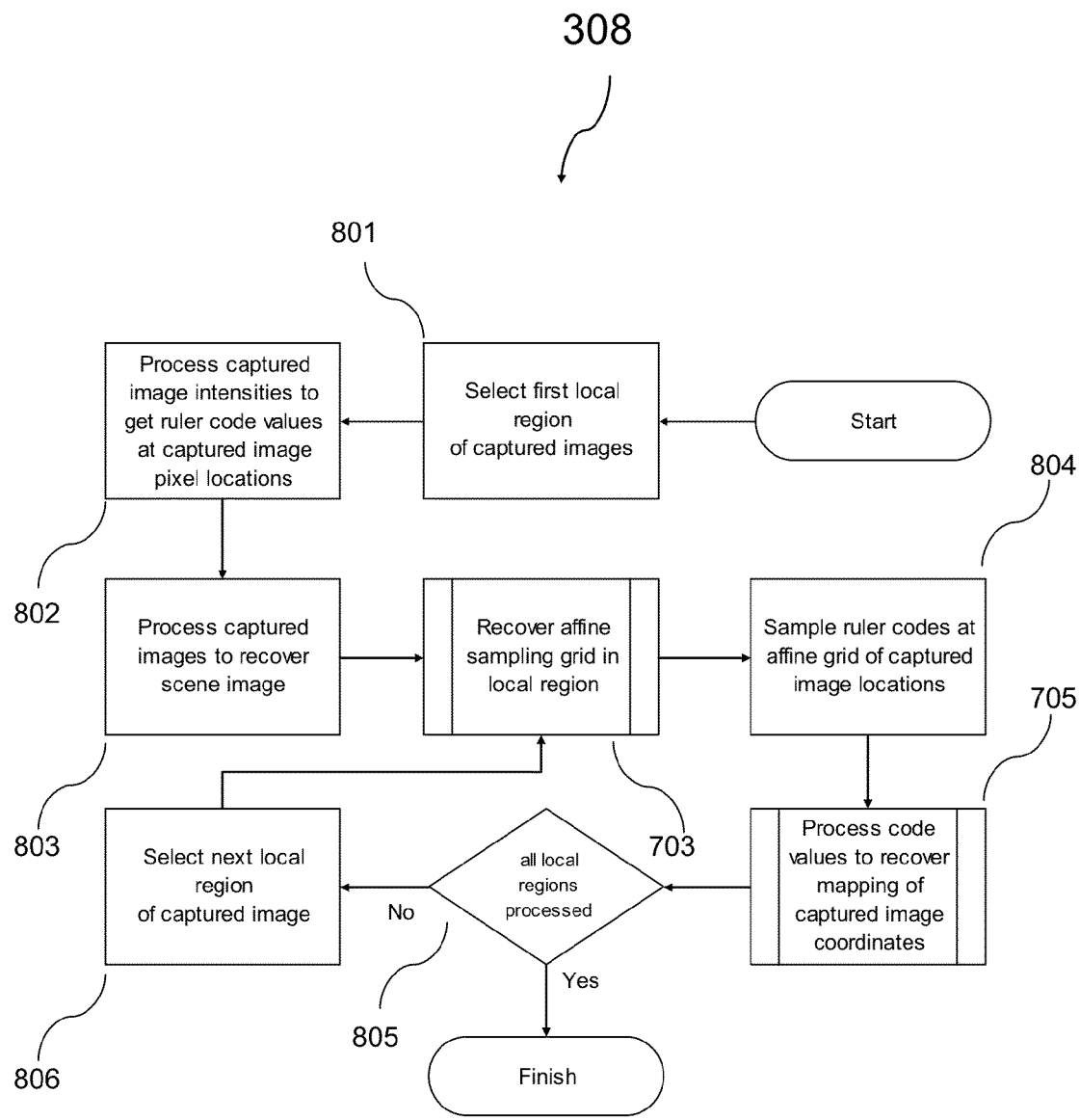
FIG. 8 is a schematic flow diagram illustrating a procedure for processing the sequence of captured images of a scene on which a phase shifted 2D Ruler Pattern sequence has been projected, to recover the coordinate mapping and an image of the scene.

FIG. 8 illustrates the process 308 for generating a mapping of the captured image coordinates to the coordinate system of the 2D ruler pattern when a short sequence of phase shifted 2D ruler patterns are projected onto the scene. If the scene is effectively static and the camera and projector are fixed, then the images in the sequence will be captured by the camera 105 and registered by storing within the computer 101. Given the captured images, the process 308 first selects in step 801 a local subregion in the images that is known to contain at least four full periods of the TBPS in at least one of the bit-planes of the ruler pattern and at least one full period in each of the other bit-planes. The ruler code values are then recovered in step 802 at the captured image pixels. This process assumes that the images in the sequence are described by a spatially variable linear mapping of the phase shifted ruler patterns with the same linear gain and offset for each captured image pixel position. The captured image pixel intensity values from each image in the phase shifted sequence are analysed using the method provided in the section entitled: Phase Shifted Sequence Construction and Analysis, discussed below. Analysis of the phase shifted image sequence in step 803 returns a scene image where the image intensities correspond to the reflectivity of the surfaces in the scene and a scene image where the image intensities correspond to the ambient lighting of the scene. The affine grid of points corresponding to the centres of the 2D ruler pattern pixels within the selected local region is then determined in step 703, as mentioned previously with reference to FIG. 9. The ruler code values are then sampled in step 804 at the affine grid of points. This can be done by simply using the code at the nearest captured image position for each affine grid point or by finding the median code value within a region smaller than one cell of the affine grid to minimise the effects of noise. The gridded sample values will correspond to an equivalent set of points in the 2D ruler pattern. The recovered code values are then processed at step 705 to decode and determine the 2D ruler coordinates corresponding to the sampled grid points. Since the grid points correspond to pixels in the 2D ruler pattern, the captured image coordinates at the grid points can be stored in an array of the same dimensions as the 2D ruler pattern to provide a map from the 2D ruler coordinates to the captured image coordinates. If multiple local regions return different captured image coordinates for the same 2D ruler coordinate, these can be averaged to reduce the variation due to noise. If there are more local regions in the captured image that remain to be processed, as tested at step 805, then the process 308 selects the next local region in step 806 and returns to process that next local region at step 703. When all local regions have been processed, as determined at step 805, the process 308 terminates.

Figure 9:
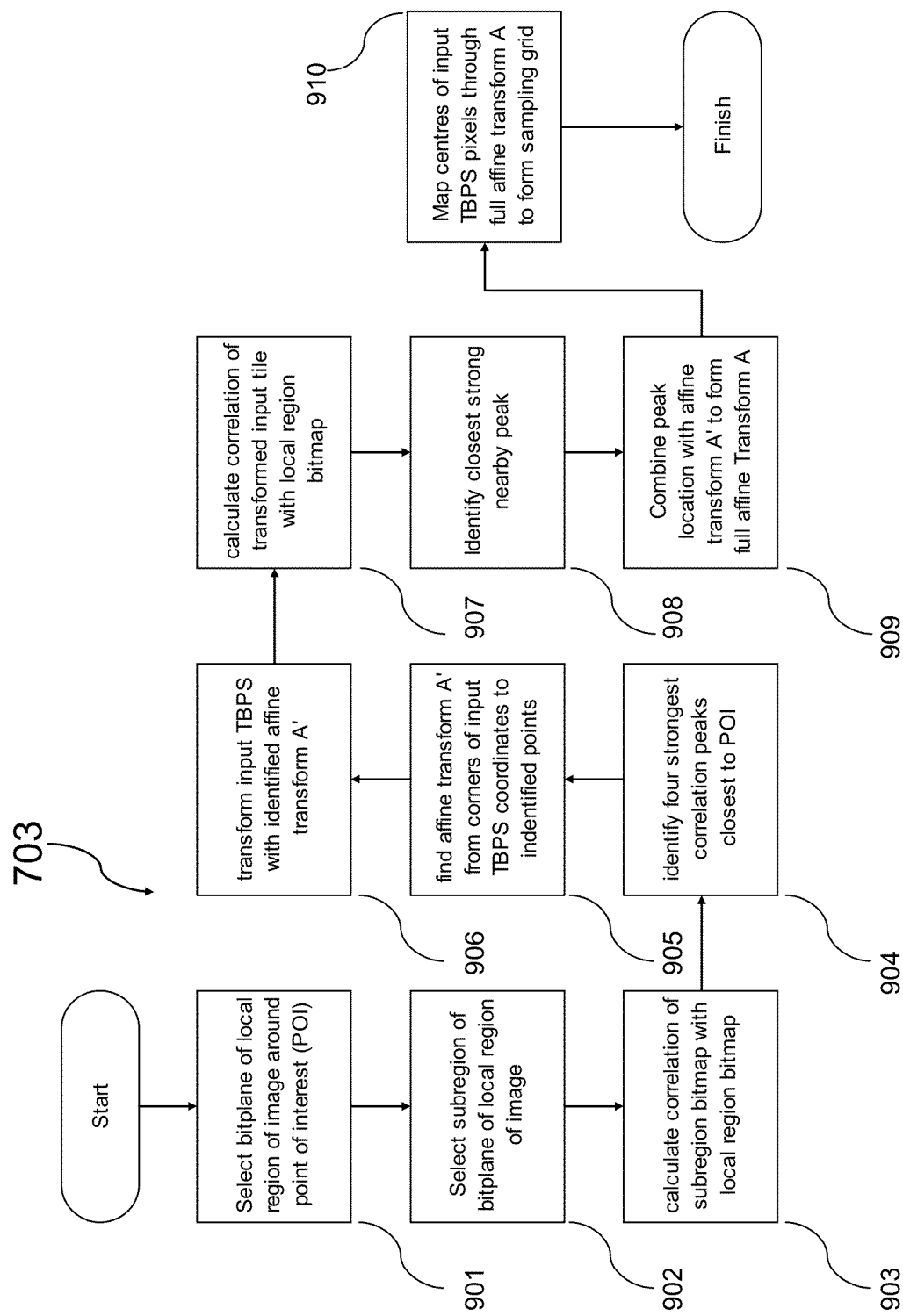
FIG. 9 is a schematic flow diagram illustrating a procedure for determining the affine distorted sampling points corresponding to a mapped portion of the 2D ruler sample grid in a selected local region of captured image.
Figure 12:
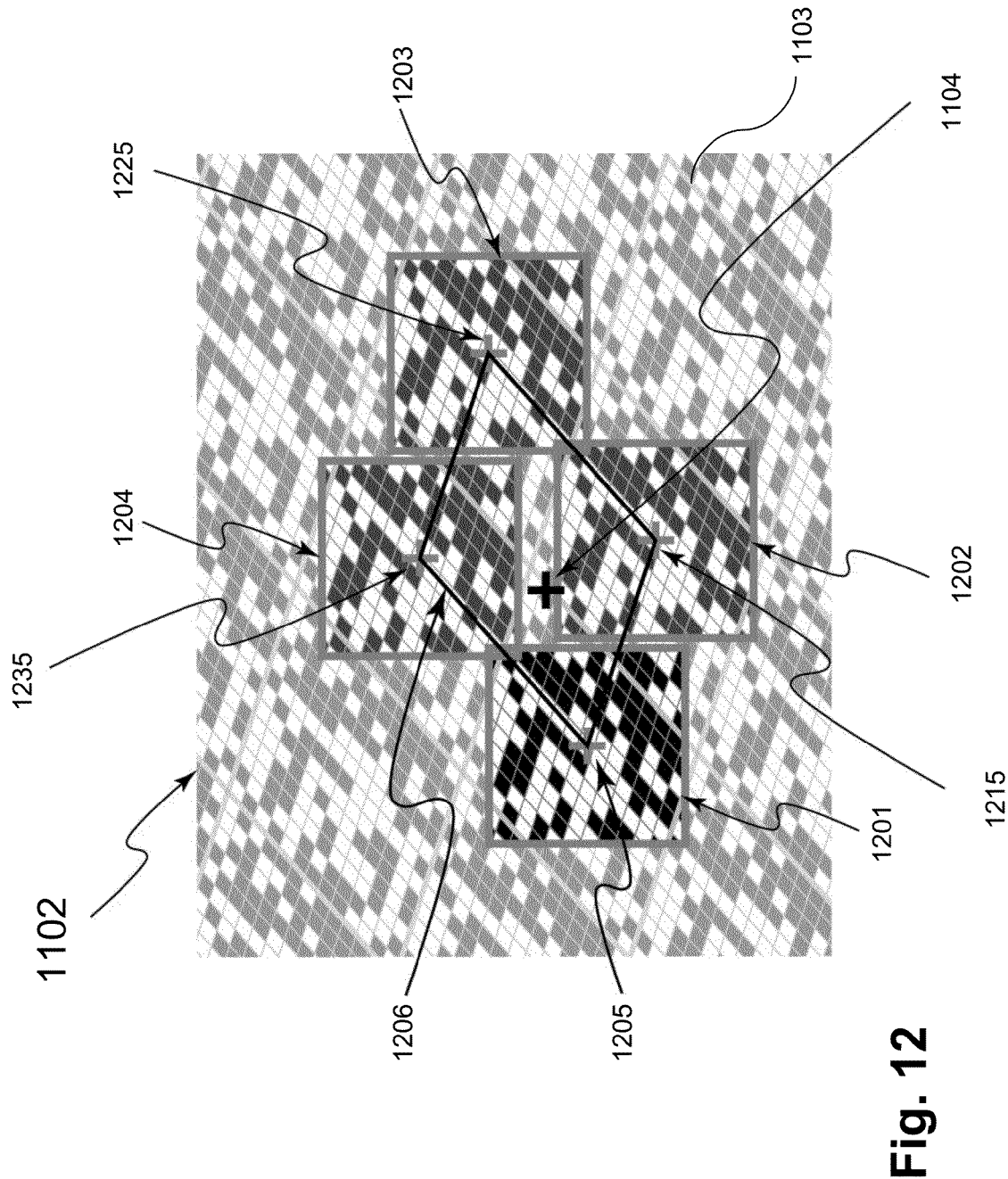
FIG. 12 illustrates the use of correlation to identify the affine scaling and shear parameters in a local region (that is, the affine transformation disregarding translation)
Figure 13:
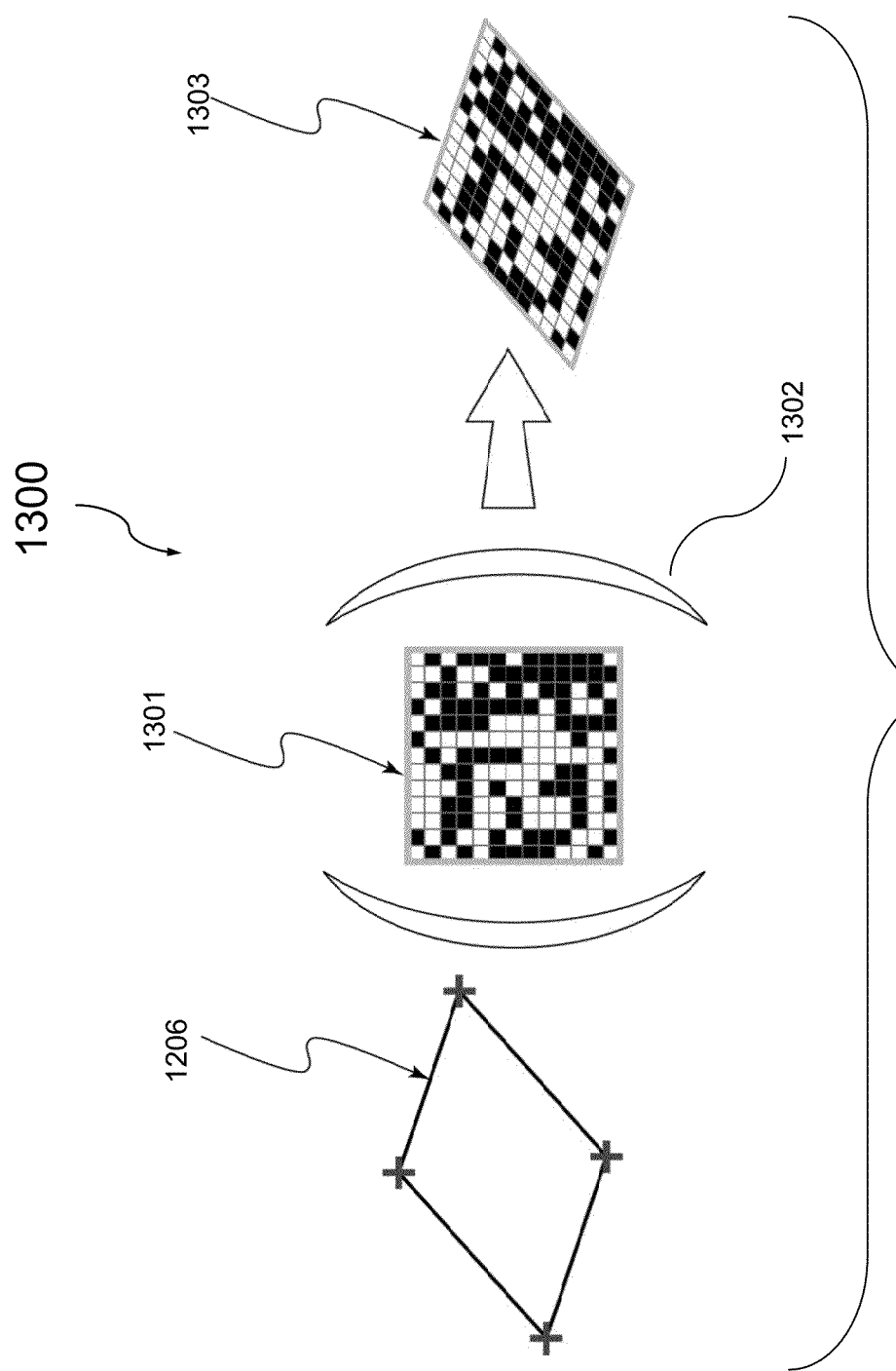
FIG. 13 illustrates the affine transformation of a TBPS from one bit-plane of the 2D ruler pattern to match the observed affine distortion (disregarding translation) observed in the captured image.
Figure 14:
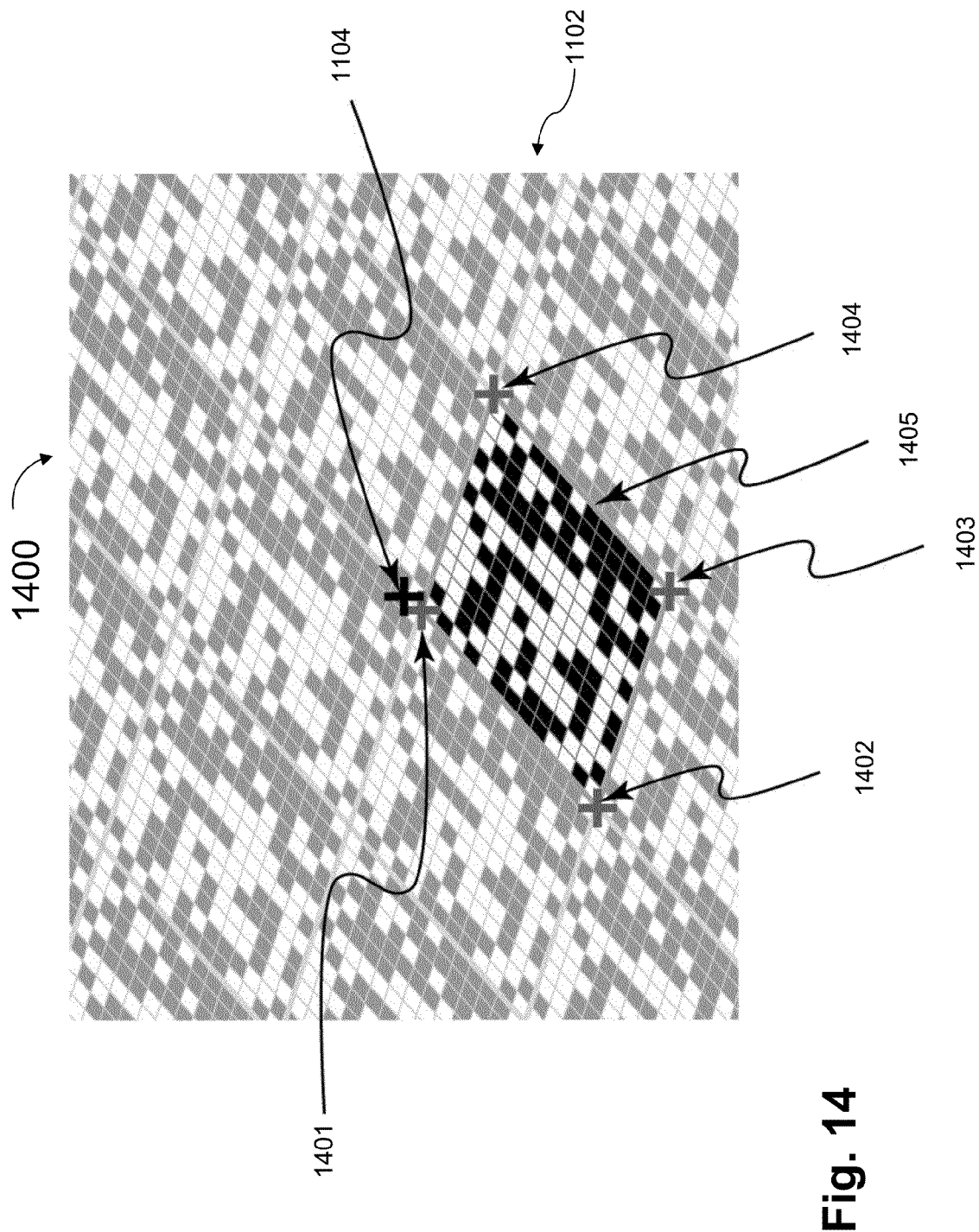
FIG. 14 illustrates the use of cross correlation to determine the translation component of the affine transform of a TBPS from one bit-plane of the 2D ruler code values in the captured image.
Figure 15:
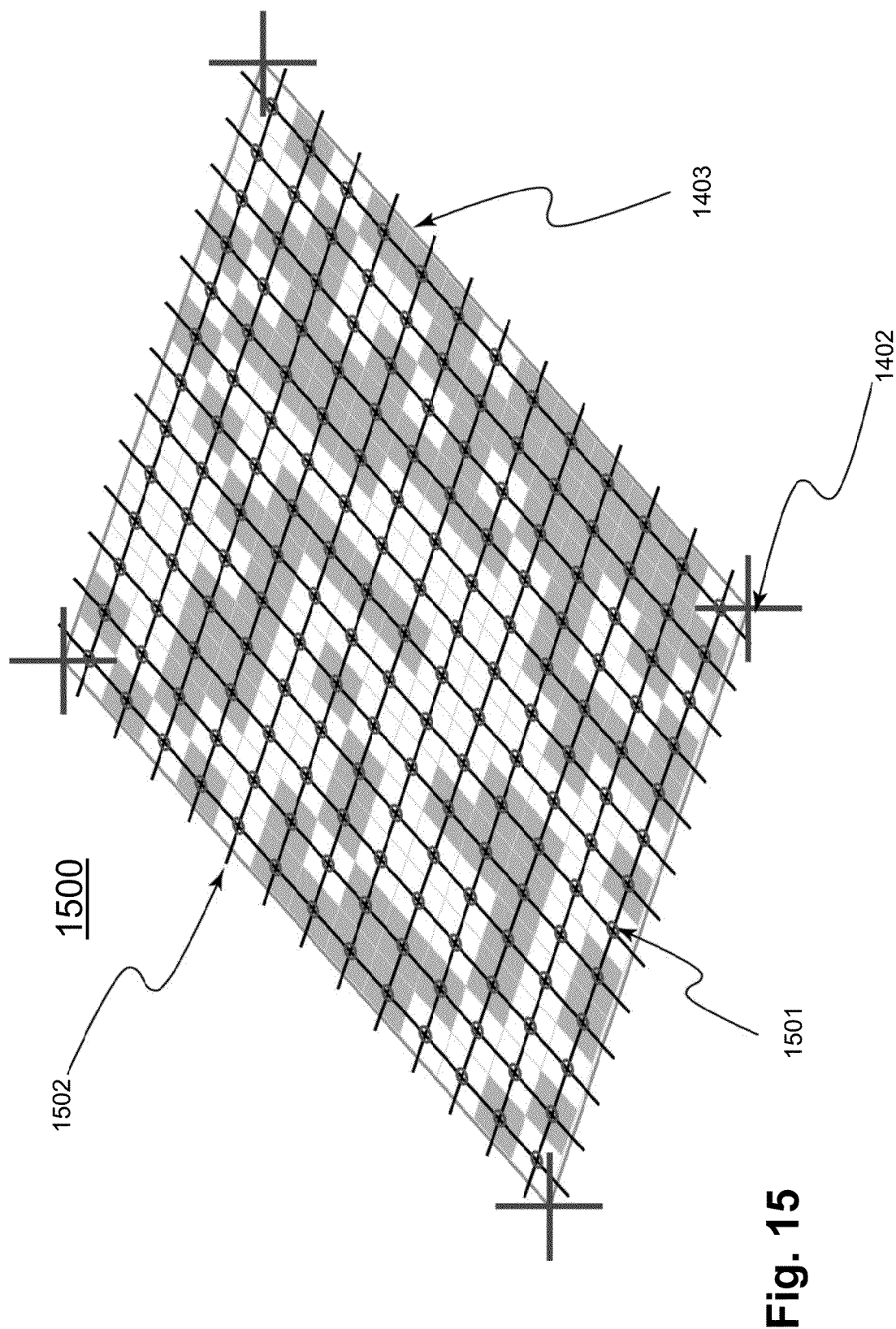
FIG. 15 illustrates the mapping of the sample grid centres of the 2D ruler to the captured image coordinate space using the estimated affine transform to establish the sample 2D ruler sample grid in the captured image.

The process 703 for establishing the affine grid of sample points in the current local region at the captured image pixel positions, as used in the processes 204 and 308, is further detailed in FIG. 9. First in step 901, from the input set of ruler code values of the current local region, the processor 1805 selects a bit-plane (usually the most significant bit-plane) around the point of interest, such as the position (x,y) in FIG. 20. As noted above, the current local region should contain at least four full periods of the TBPS tile pattern for the selected bit-plane. The selection process of step 901 is further illustrated in FIG. 11 for a portion 1100 of the captured image 2000 where the selected bit-plane of the ruler code image 1101 is illustrated and the selected local region 1102 is highlighted around a point of interest 1104, with the TBPS tile boundaries 1103 being shown for illustrative purposes. Within the selected local region 1102, the process 703 then selects a subregion in step 902. This is further detailed in FIG. 12 showing a selected subregion 1201 within the selected local region 1102 around the point of interest 1104. Step 903 then calculates the correlation of the bit-plane of the selected subregion 1201 with the bit-plane of the current local region 1102. In step 904, the processor 18005 operates to identify the four strongest correlation points closest to the point of interest. In FIG. 12, these correlation points are shown by crosses 1205, 1215, 1225, 1235 which are centrally located within corresponding regions 1202, 1203, 1204, as highlighted.

Step 905 then operates to ascertain an affine transform A' from the corners of the periodic support of the TBPS tile for the selected bit-plane, to the positions (indicated by the crosses 1205, 1215, 1225, 1235) of the correlation peaks, arising from the correlation of the selected subregion 1201. Note that the identified region 1206 defined by the selected correlation peaks 1205, 1215, 1225, 1235, will correspond to one period of the tiled TBPS bit-plane, but may be offset from the periodic tile boundaries. In step 906, the processor 1805 executes to transform the TBPS tile pattern using the affine transform A' to produce a version of the TBPS tile sampled on the captured image coordinate of the current local region 1102. This is illustrated by a process 1300 in FIG. 13, where the application of the affine transform 1206 to the original TBPS tile 1301 gives a transformed tile 1303. Step 907 then operates to cause the processor 1805 to calculate the correlation of the transformed TBPS tile 1303 with the selected bit-plane of the current local region 1102.

Step 908 then operates to identify the closest strong correlation peak. The position of the identified peak and the scale and shear parameters of the affine transform A' are used by the processor 1805 in step 909 to construct the transform A from the TBPS tile coordinate system to the coordinate system of the current local region. This process is further illustrated at 1400 in FIG. 14 which shows the selected local region 1102 of the selected bit-plane around the point of interest 1104 and the location of the closest strong correlation peak at 1401 with the correlated tile 1405 identified by the locations of the correlation peaks 1402, 1403, 1404 corresponding to the other corners of the TBPS tile. The process 703 then, in step 910, uses the affine transform A to map the centres of the pixels in the TBPS tile to the captured image coordinate system, thus forming the affine grid of sampling positions corresponding to the TBPS tile pixel centres. The process 703 then concludes. The operation of step 910 is illustrated at 1500 in FIG. 15 where the mapped centres 1501 of the TBPS tile are shown on the affine sampling grid 1502.

Figure 10:
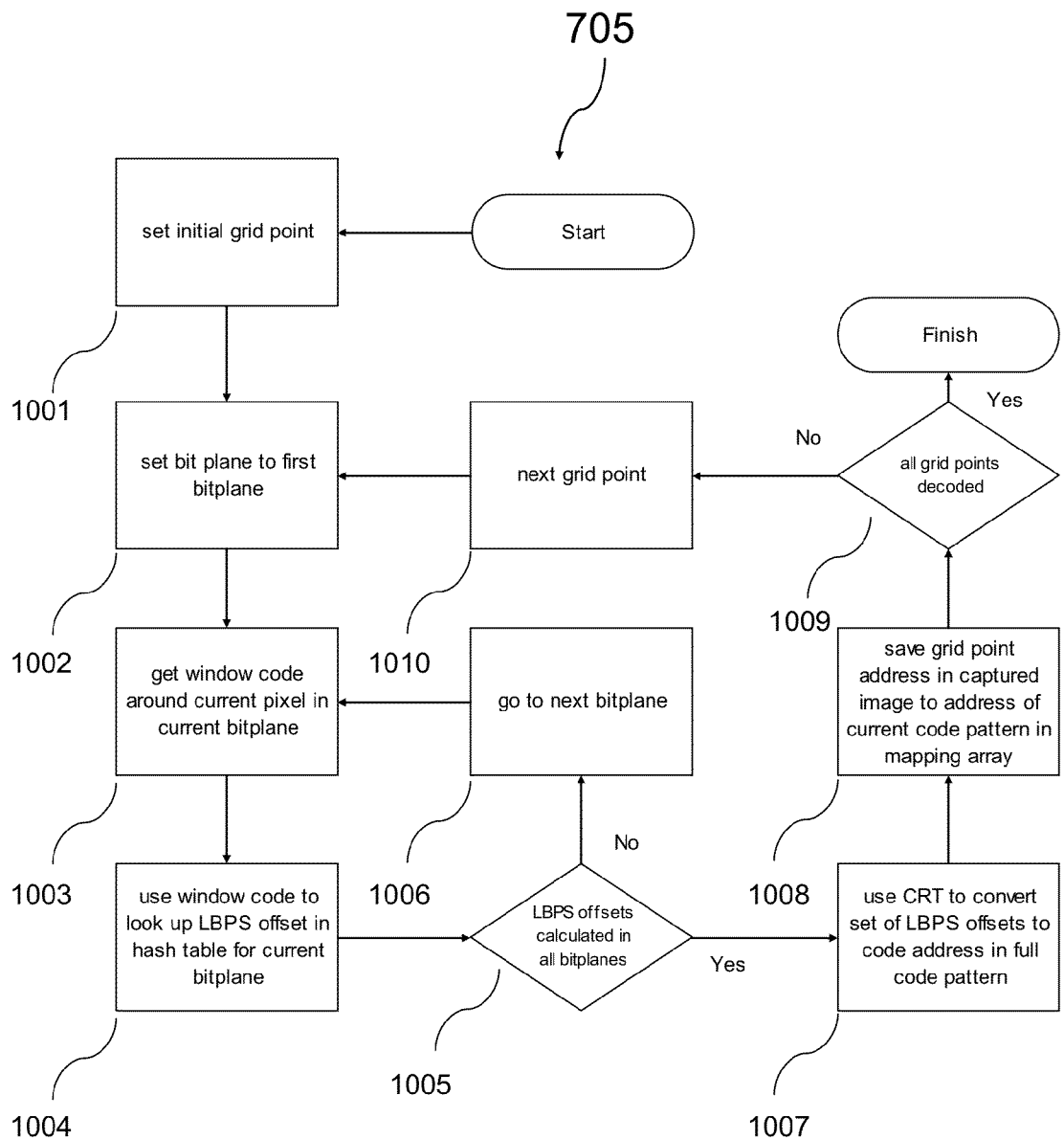
FIG. 10 is a schematic flow diagram illustrating a procedure to process the recovered ruler code values from a local region to create the mapping data for that region.
Figure 11:
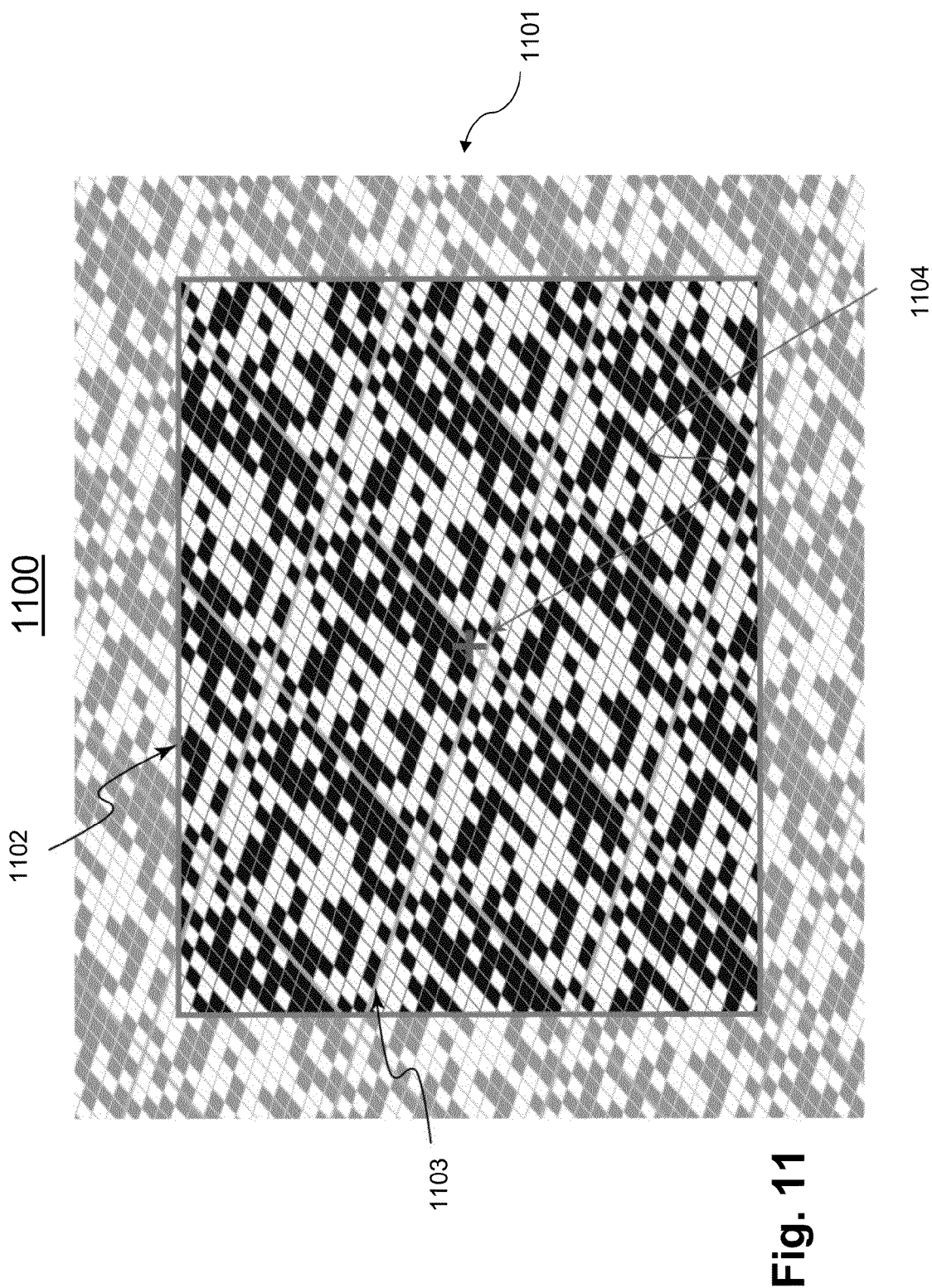
FIG. 11 illustrates the selection of a local region of a bit-plane of the ruler code values from a captured image.

The process 705 which, as discussed above, takes the ruler codes on the affine grid of sample points in the current local region and returns a decoded mapping from the 2D ruler pattern coordinates to the captured image coordinates, is further detailed in FIG. 10. Firstly, in step 1001, the initial grid point in the affine grid of sampled ruler codes is set by the processor 1805. Then in step 1002 the bit-plane is set to the first bit-plane. Step 1003 follows where the window code is then recovered from grid points in the current bit-plane within the defined window around the current grid point. The window code is then used in step 1004 to look up the offset in the TBPS for the current bit-plane using the hash table constructed earlier in step 607. If there are more bit-planes remaining for which the TBPS offsets must be determined for the current grid point, as determined in step 1005, then the process 705 proceeds to select the next bit-plane in step 1006, and returns to step 1003 for processing the next bit-plane. If TBPS offsets for all bit-planes for the current grid point have been determined, as assessed at step 1005, then the process 705 proceeds to step 1007 where the processor 1805 uses these offsets to determine a coordinate in the 2D ruler pattern.

In step 1007, the horizontal and vertical offsets can be processed independently. An equivalent process is used for both the horizontal and vertical offsets. If the horizontal coordinate of the current point in the 213 ruler pattern is x and the offset in the TBPS tile of the $i_{th}$ bit-plane is $o_i$, and the horizontal size of the TBPS tile in the $i_{th}$ bit-plane is $d_i$, then a set of congruences $$o_i \equiv x \bmod d_i \quad (2)$$

can be formed.

For n bit-planes, the above will provide n such congruences and these congruences allow the calculation of the horizontal coordinate x within the 2D ruler. The size of the 2D ruler will be limited to a size over which this set of congruences has a unique solution for all grid points in the ruler. This size X, is equal to the least common multiple of the horizontal sizes of the TBPS tiles, being:

$$X = LCM(d_1, \ldots, d_i, \ldots, d_n). \quad (3)$$

If the horizontal sizes of all of the TBPS bit-planes are co-prime, then this limit to the size of the ruler is just the product of the horizontal TBPS tile sizes, being:

$$X \equiv d_1 \times \ldots \times d_i \times \ldots \times d_n. \quad (4)$$

The calculation of the horizontal coordinate from the congruences relies on the Chinese Remainder Theorem (CRT). There are many methods for solving this set of congruences. One method, which works for any set of tile sizes, is to enumerate, for each congruence, all coordinates x up to X which satisfy the congruence. When this is done for all of the congruences there will be only one coordinate that satisfies all congruences.

An equivalent process can be used to determine the vertical coordinate of the current point in the 2D ruler from the vertical offsets in the TBPS tiles for each bit-plane.

Step 1008 then follows where coordinates of the current affine grid point in the captured image are then saved by the processor 1805 in the mapping array formed in the memory 1806 at the 2D ruler pattern address corresponding to the set of window codes for the current point. If there are more grid points remaining to be decoded, as tested in step 1009, then the process 705 proceeds to select the next grid point at step 1010, and then returns to step 1002 for processing that grid point as before. If at step 1009, there are no more grid points left to process, then the process 705 is completed.

It is to be noted that the method of FIG. 6 for updating a 2D look-up table that assist the decoding process of FIG. 10, is not essential, nor is the specific decoding process of FIG. 10. The table may be constructed at any point prior to decoding providing the ruler is available, and is not required before projection.

In an alternative implementation, the decoding may be performed by a simple (brute-force) search, as used in prior art approaches. In such instances, the look-up table is not required.

Figure 17:
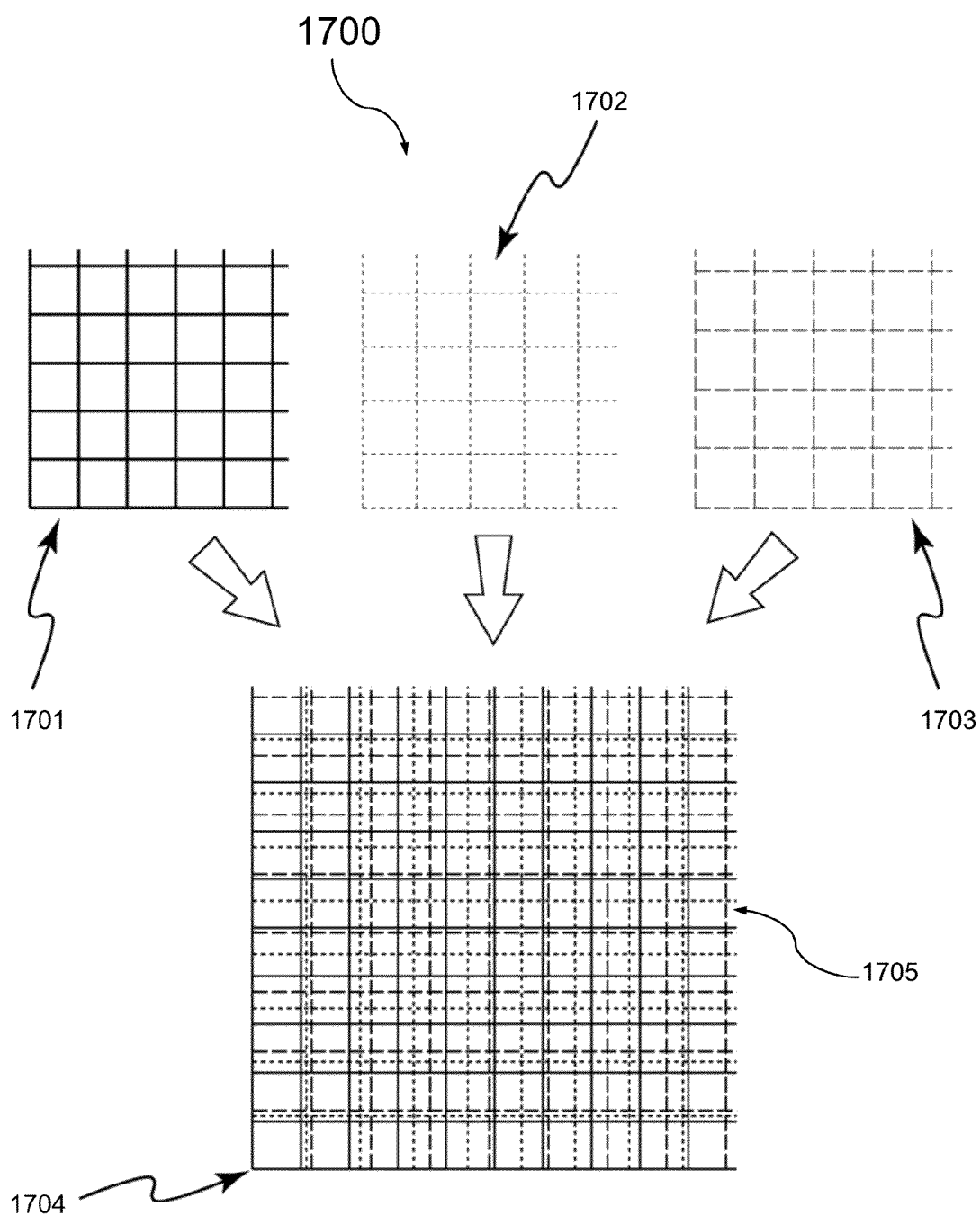
FIG. 17 illustrates the combination of the tiled TBPS images as bit-planes of the 2D ruler pattern showing the alignment of the TBPS tile boundaries in the several bit-planes.

The principle underlying the interaction of the tiled bit-planes to produce a 2D ruler having a much larger period than the periodicities of the TBPS tiles is illustrated in FIG. 17. The figure shows a pattern of tiling boundaries for a system with three bit-planes. The tile boundaries for the first 1701, second, 1702 and third 1703 bit-planes are illustrated. The tile boundaries all align at the origin point 1704 and the alignment of the tile boundaries in a portion of the 2D ruler pattern is shown 1705.

Phase Shifted Sequence Construction and Analysis

When the 2D ruler is projected, variations in the ambient light, the reflectivity of the surface 104 and angle of the surface 104 to the camera 105 can cause significant variation in the intensity of the captured patterns from one point in the captured scene to another. This can make it difficult to ensure that the bit-planes in the pattern are accurately recovered. To address this, a sequential phase shifting approach, such as that shown in FIG. 3, can be used to increase the robustness of the system 100 to these spurious variations in captured intensity.

If there are n bit-planes in the 2D-ruler, then the ruler will have $K=2^N$ possible integer code values (1 to K) at each point. For a code value k, a phase value is assigned as follows:

$$\phi_k = \frac{2\pi(k-1)}{K}. \quad (5)$$

The phase values are quantised for each code value and are used to construct a series of pattern images that are projected onto the scene and captured in sequence. The pattern images are constructed so that the intensity for a given position that has code value k is represented in the sequence of images with a series of Q intensity values $i_{qk}$ in which:

$$I_{qk} = \alpha(1 + \sin(\phi_k + \psi_q)) \quad (6)$$

where $\psi_q$ are a predetermined sequence of imposed phase shifts, which are the same for all locations in the $q^{th}$ image of the sequence.

Figure 23:
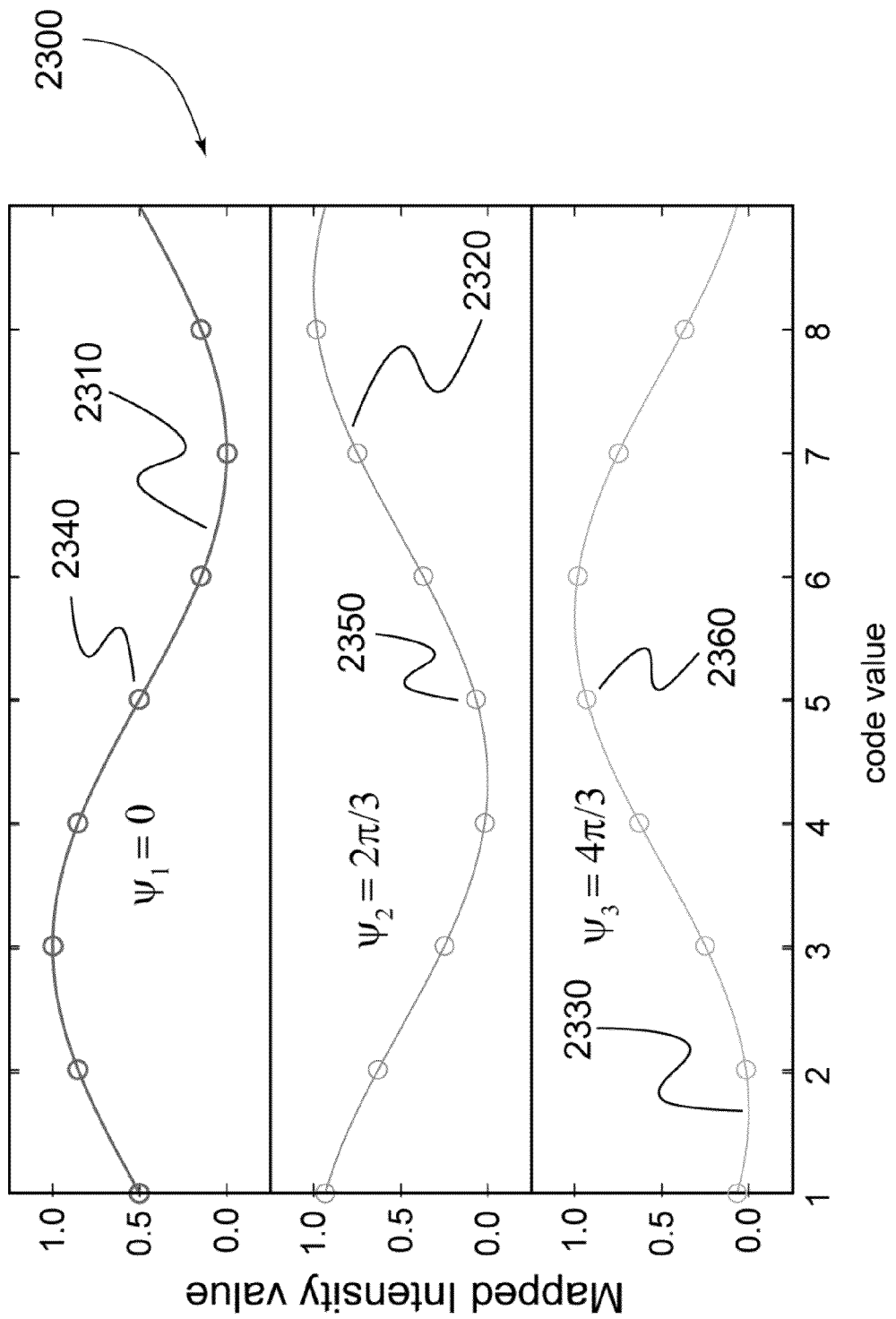
FIG. 23 illustrates the concept of phase shifting.
Figure 24:
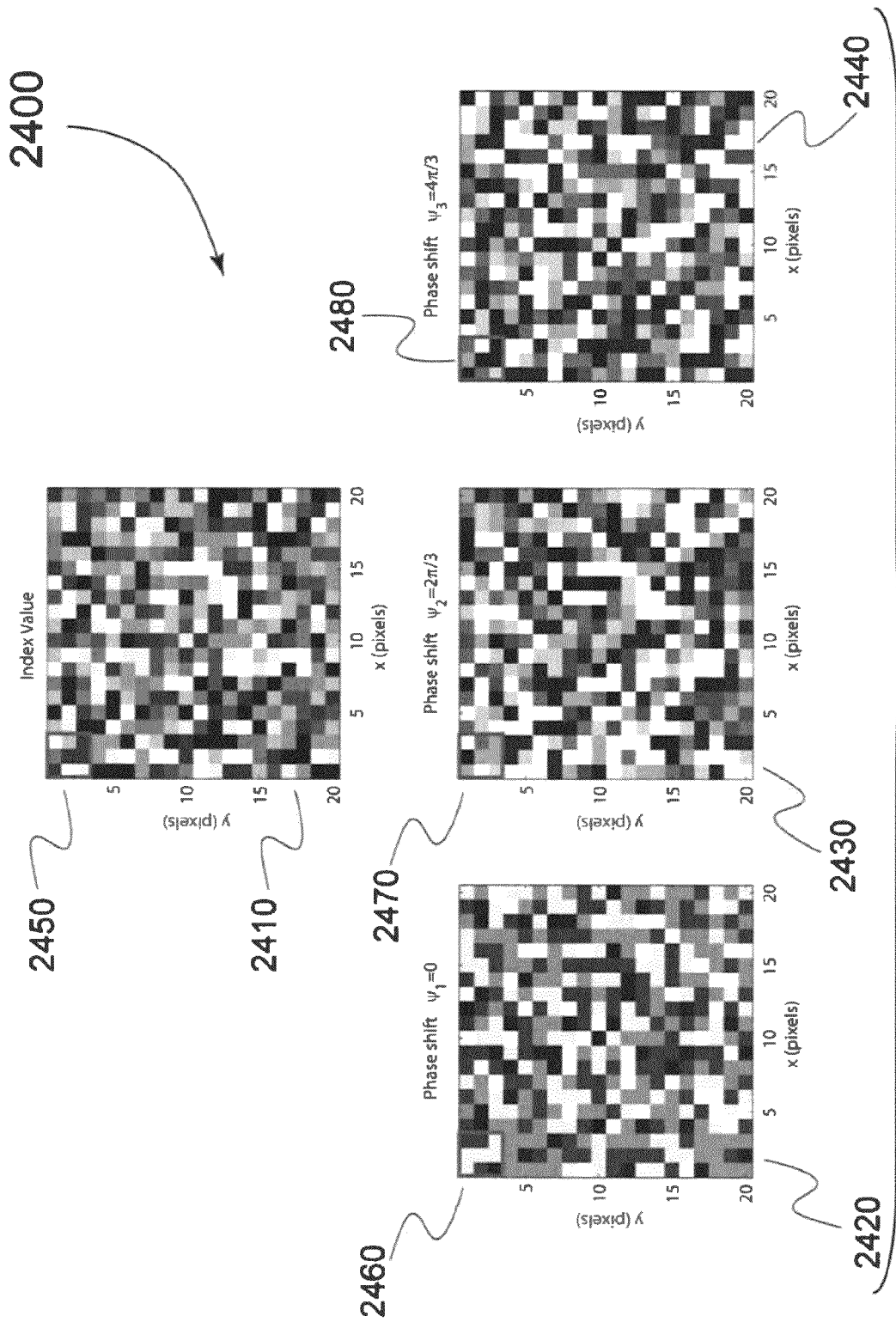
FIG. 24 illustrates the application of phase shifting to the pattern across a series of projected patterns for improving robustness of measurements to lighting variation, surface reflectance and other sources of spurious intensity variation in the captured image.

The mapping from code value to the image intensity values is illustrated in FIG. 23 where the mapping 2300 shows the sinusoidal curves for the first 2310, second 2320 and third 2330 images in the sequence. The code values (which here take the values 1 to 8) are mapped to points on these curves so that for example, the code value 5 maps to the three different intensities 2340, 2350, 2360 for the three images in the sequence. This is further illustrated in FIG. 24 which shows 2400 the resulting intensity patterns in each of the images in the sequence 2420, 2430, 2440 that result from the corresponding section of the code pattern 2410. The figures illustrate an exemplary window in the code pattern 2450 and the corresponding window 2460, 2470, 2480 in each of the images in the sequence. Scaling and offset (cosine) of the sinusoidal image are a consequence of the projection and capture process.

When the intensity of this region is captured the sequence of intensity values is modified by spatial variations in the reflectivity of the surface and in the ambient lighting, by the gain and offset of the image projection and capture device, and by noise. There may also be a non-linearity in the response of the overall system 100, but for the present purposes this is assumed to be either small, and thus able to be ignored, or otherwise as having been corrected. The captured intensity sequence at the position of interest will have intensities $$p_q = b + \alpha \sin(\phi + \psi_q) + \epsilon_q, \quad (7)$$

where it is assumed that an additive background, b, and a local modulation factor a are invariant from one image in the sequence to the next at the position of interest.

Eq. 6 can be expanded to give $$p_q = b + \alpha \sin(\phi)\cos(\psi_q) + a \cos(\phi)\sin(\psi_q) + \epsilon_q. \quad (8)$$

The full system of equations, for all K images can be written in vector-matrix form as:

$$\begin{bmatrix} p_1 \\ \vdots \\ p_q \\ \vdots \\ p_Q \end{bmatrix} = \begin{bmatrix} \cos(\psi_1) & \sin(\psi_1) & 1 \\ \vdots & \vdots & \vdots \\ \cos(\psi_q) & \sin(\psi_q) & 1 \\ \vdots & \vdots & \vdots \\ \cos(\psi_Q) & \sin(\psi_Q) & 1 \end{bmatrix} \begin{bmatrix} \alpha \\ \beta \\ b \end{bmatrix} + \begin{bmatrix} \epsilon_1 \\ \vdots \\ \epsilon_q \\ \vdots \\ \epsilon_Q \end{bmatrix} \quad (9)$$

where $$\alpha = a\sin(\phi) \quad (10)$$
$$\beta = a\cos(\phi)$$

Provided Q≥3 and the chosen phase shifts $\psi_q$ result in a non-singular, well conditioned matrix, the resulting set of linear equations can be solved for α, β and b.

The set of linear equations (9) can be written more compactly in vector matrix notation as $$p = Ma + \epsilon \quad (11)$$

where $$M = \begin{bmatrix} \cos(\psi_1) & \sin(\psi_1) & 1 \\ \vdots & \vdots & \vdots \\ \cos(\psi_q) & \sin(\psi_q) & 1 \\ \vdots & \vdots & \vdots \\ \cos(\psi_Q) & \sin(\psi_Q) & 1 \end{bmatrix},$$

$$a = \begin{bmatrix} \alpha \\ \beta \\ b \end{bmatrix},$$

$$p = \begin{bmatrix} p_1 \\ \vdots \\ p_q \\ \vdots \\ p_Q \end{bmatrix},$$

$$\epsilon = \begin{bmatrix} \epsilon_1 \\ \vdots \\ \epsilon_q \\ \vdots \\ \epsilon_Q \end{bmatrix}$$

The squared measurement error is given by $$\sigma^2 = \epsilon^T \epsilon \quad (12)$$
$$= (Ma - p)^T(Ma - p)$$
$$= (a^T M^T - p^T)(Ma - p)$$
$$= a^T M^T Ma - p^T Ma - a^T M^T p + p^T p$$

This error is minimised when $$\frac{\partial \sigma^2}{\partial a} = 0 \quad (13)$$

$$\frac{\partial \sigma^2}{\partial a^T} = \frac{\partial(a^T M^T Ma - p^T Ma - a^T M^T p + p^T p)}{\partial a^T} \quad (14)$$
$$= \frac{\partial(a^T M^T Ma)}{\partial a^T} - \frac{\partial(p^T Ma)}{\partial a^T} - \frac{\partial(a^T M^T p)}{\partial a^T}$$
$$= 2(M^T M)a - 2M^T p$$

So the least squares solution for a satisfies $$M^T Ma = M^T p \quad (15)$$

Since the imposed phase steps $\psi_k$ are known, M is also known. As p is just the set of measured pixel intensities at the chosen position, this is a simple linear system of the form $$Qa = q \quad (16)$$

with $Q = M^T M$ and $q = M^T p$, both of which are known. This linear matrix equation can therefore be solved for a.

There is considerable freedom in the choice of both the number of pattern images in the phase sequence and the set of phase shifts $\psi_q$ to be applied to each image in the sequence. A minimum of three images is required for the system of equations to be solvable. With three images and phase shifts of 0, 2π/3, 4π/3 for example, equation (9), neglecting the noise term, becomes $$\begin{bmatrix} p_1 \\ p_2 \\ p_3 \end{bmatrix} = \begin{bmatrix} 1 & 0 & 1 \\ -\frac{1}{2} & \frac{\sqrt{3}}{2} & 1 \\ -\frac{1}{2} & -\frac{\sqrt{3}}{2} & 1 \end{bmatrix} \begin{bmatrix} \alpha \\ \beta \\ b \end{bmatrix} \quad (17)$$

which can be solved exactly to give $$\begin{bmatrix} \alpha \\ \beta \\ b \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \\ \frac{1}{3} & \frac{1}{3} & \frac{1}{3} \end{bmatrix} \begin{bmatrix} p_1 \\ p_2 \\ p_3 \end{bmatrix} \quad (18)$$

The phase value can be recovered as $$\phi = a\tan2(\alpha, \beta) \quad (19)$$

and the integer code value is $$k = 1 + \mathrm{round}\left(\frac{\phi K}{2\pi}\right) \quad (20)$$

The parameter a can be recovered from $$\alpha = \sqrt{\alpha^2 + \beta^2} \quad (21)$$

and will be related to the reflectivity of the surface at that point in the scene.

The offset parameter b will provide a scene image without the projected code where the value of b is related to the ambient light in the scene from the current point in the image.

The phase shifting techniques described above may be used to identify positions with substantial independence from variations in ambient lighting, surface colour and surface reflectance.

The process for creating a ruler pattern using Toroidal Binary Perfect Submaps can be generalised to use a prime radix, R, other than 2 to permit Tileable R-ary Perfect Submaps (TRPSs) to make the ruler pattern. TRPS are analogous to TBPSs but, rather than having values of 1 or 0, use values from 0 to R−1. This permits smaller code windows to be achieved at the cost of increasing the number of discrete values in the pattern.

Figure 25:
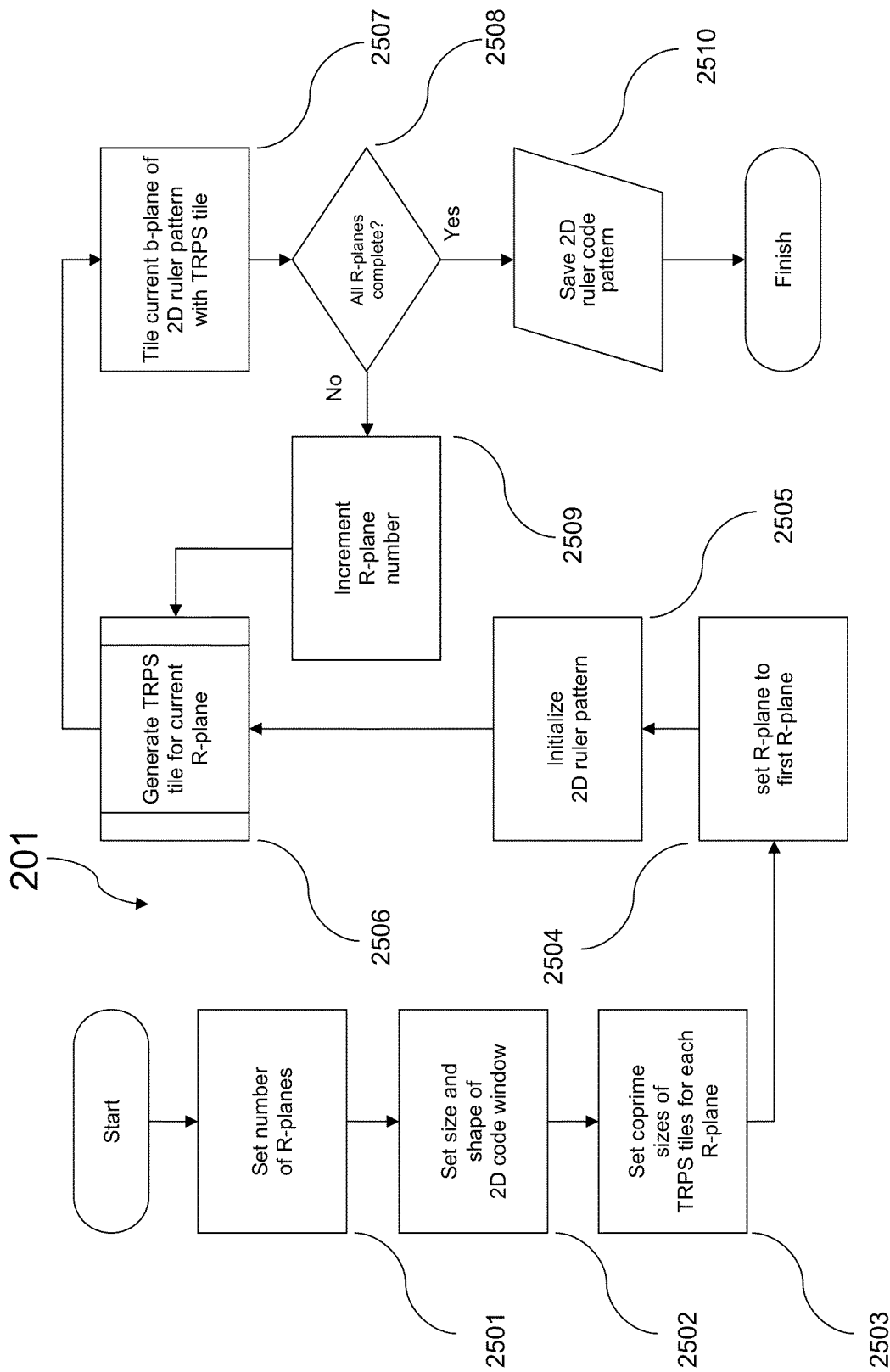
FIG. 25 is a schematic flow diagram illustrating a procedure for creating a 2D ruler code pattern based on Toroidal R-ary Perfect Submaps (TRPS)
Figure 27:
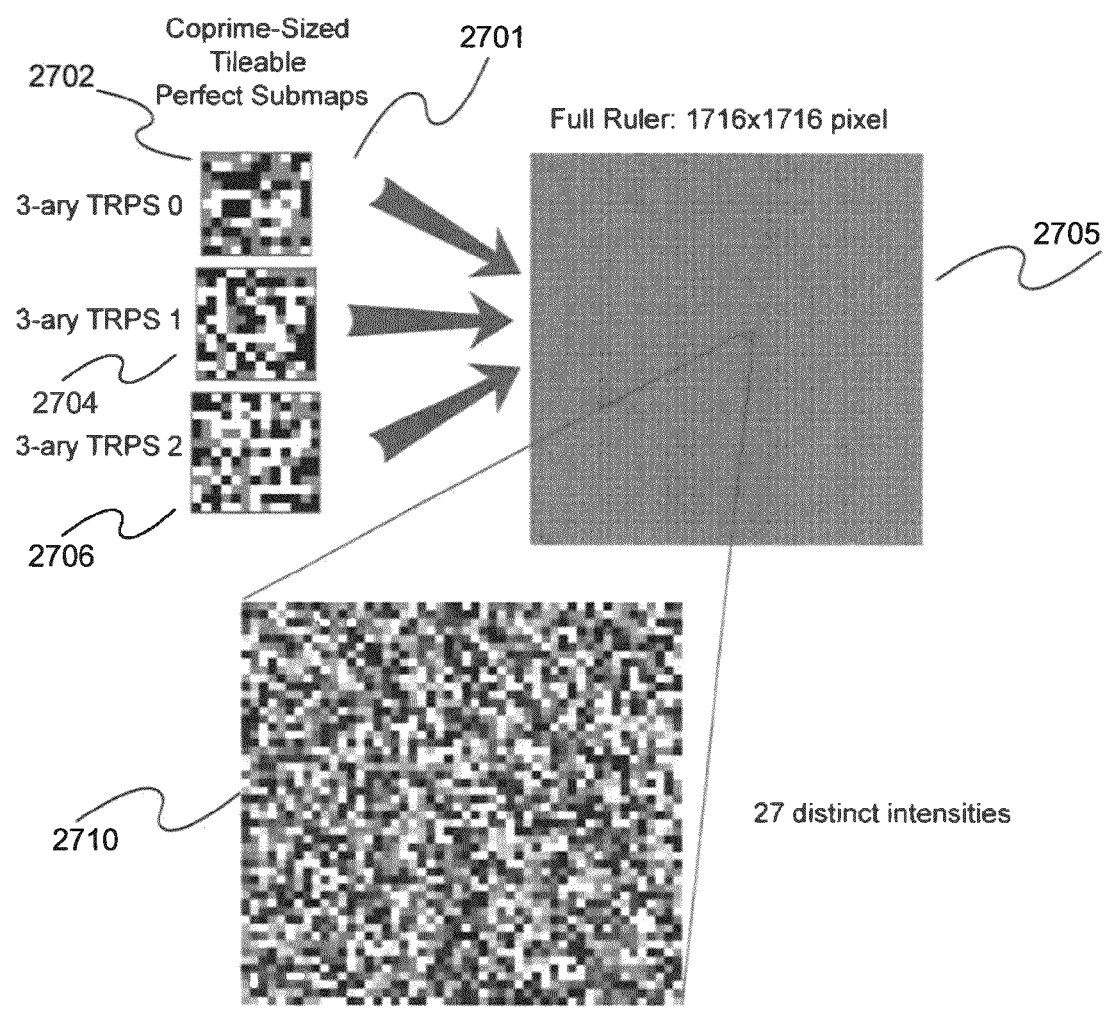
FIG. 27 is a schematic flow diagram illustrating a procedure for creating a TRPS.

Detail of a process 201 for creating the 2D ruler pattern using TRPSs, used in the processes 200 and 300, is illustrated in FIG. 25. The process 201 of FIG. 25 is desirably implemented as software executable by the processor 1805 of the computer 101. First, a number of R-planes to be used for encoding is set at step 2501 where R-planes are arrays of integers base R. The next step 2502 involves the setting of the size and shape of a 2D code window. The code window needs to be large enough to code more than the number of points in the 2D ruler pattern. If there are M points in the 2D ruler pattern and each point takes one of $K=R^n$ possible values, where n is the number of R-planes, then the number of pixels in the 2D code window must be strictly greater than $\log_K(M) = \log_R(M)/n$. In the specific implementations described herein, a code window size of 5 pixels is used (as per FIG. 21B). With reference to FIG. 27, n=3, R=3, M=(1716×1716) =2944656, and therefore (5>$\log_3$(2944656)/3).

The shape of the code window can be rectangular, square, or any pattern of contiguous or non-contiguous pixels. For the present particular implementation, the code window is a cross shaped arrangement of 5 pixels, as seen for example in FIG. 21B. Other shapes for the code window may be used. FIGS. 21B to 21D show some alternate arrangements for code windows that may be used. A more compact shape will result in fewer problems with loss of points (due to occlusion for example). The size of the code window determines the maximum size of the TRPS (which will be achieved when the TRPS is actually a perfect map—i.e. all possible codes are present for exactly one location in the TRPS). The larger the window code, the less codes are used in the pattern, which increases the robustness to errors in the capture and analysis process.

Next, in step 2503, the size of the R-ary tiles used to construct the bit-planes is set. The tiles should have more points than the code window, and the code window shape should desirably not share ruler grid points with periodic copies of itself on a period of the tile size. This feature is desirable because the size of the window should be as small as possible to provide a unique code for each location in the pattern—allowing for some redundancy to provide robustness. If the Ode window shares ruler grid points with periodic copies of itself then the number of possible unique codes is reduced relative to a code window of the same size that does not share ruler grid points with periodic copies of itself. The size of each tile must be such that for each dimension, the LCM of the tile sizes is larger than the size of the 2D-ruler. This predicates that the tiles sizes for each bit-plane are co-prime in order to maximize the size of the pattern whilst avoiding potential ambiguity.

The first bit-plane is selected at step 2504 and the 2D ruler pattern is initialized at step 2505. A TRPS tile for the current R-plane is created in step 2506 and used to tile the current R-plane of the 2D ruler in step 2507. If there are more R-planes remaining to be generated, as tested in step 2508, then the next R-plane is selected at step 2509 and the processing continues from step 2506 as before. If there are no more R-planes to complete, as determined at step 2508, then the 2D ruler is saved by the processor 1805 to the memory 1806 or 1810 in step 2510 and the processing terminates.

The R-planes are combined mathematically to form the image in an analogous way to combining bitplanes to form an image.

$$I_{i,j} = \sum_{n=1}^{N} I_{i,j,n} R^{n-1}. \quad (22)$$

where $I_{i,j,n}$ is the value in the $n^{th}$ R-plane at location (i,j) and R is the radix of the R plane.

Figure 26:
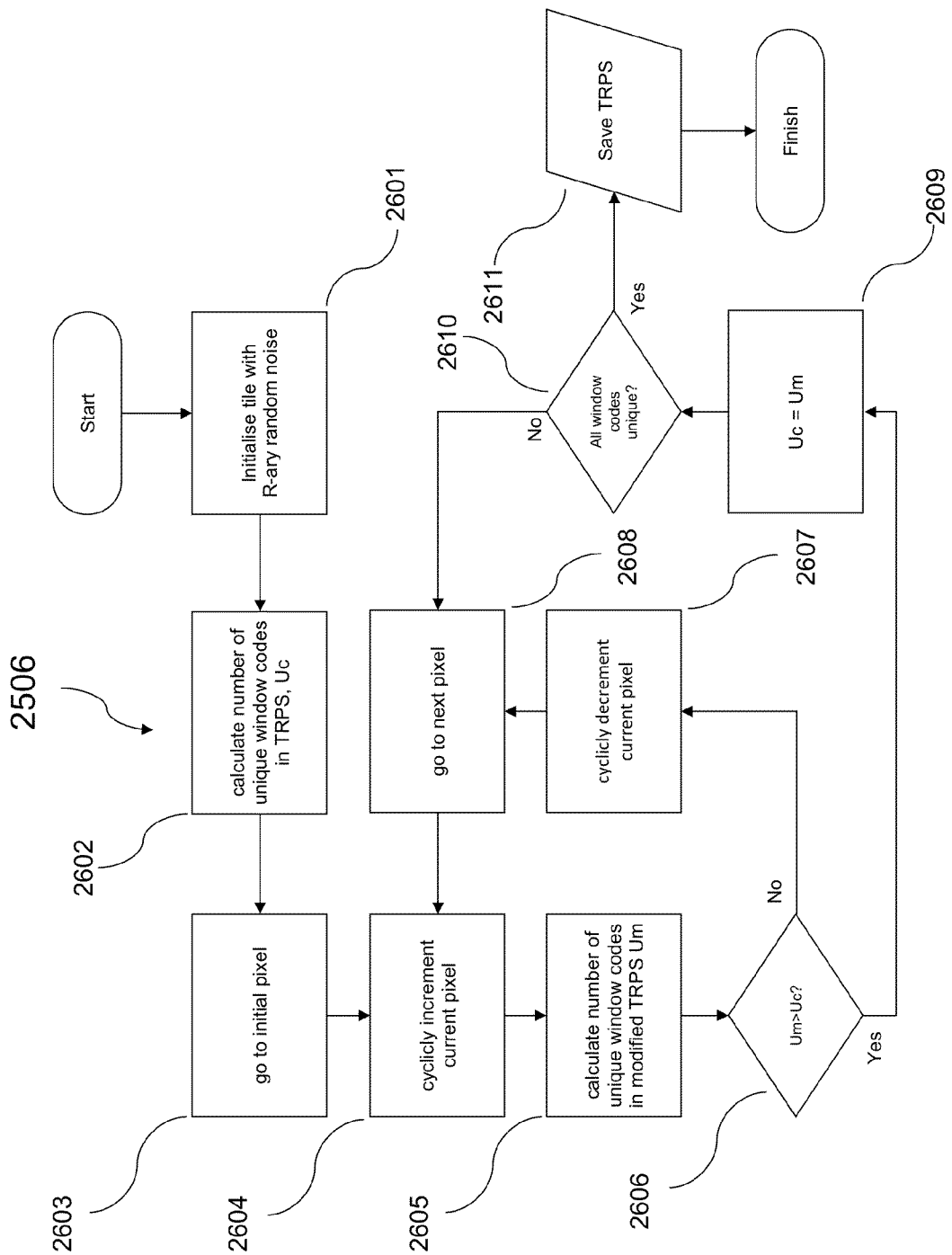
FIG. 26 illustrates an exemplary 2D ruler pattern according to the present disclosure based on TRPSs.

The construction of each TRPS is illustrated in FIG. 26 where the tile is first initialised in step 2601 with R-ary random noise. The number of window codes that occur exactly once in the tile is determined and assigned to the current uniqueness measure $U_c$ 2602. The current pixel is set to a first pixel in the tile in step 2603. That pixel is cyclicly incremented in step 2604 (by adding 1 modulo R) and the number of window codes that occur in the now modified tile exactly once is calculated and assigned to the modified uniqueness measure $U_m$ in step 2605. If $U_m$ is not greater than the current uniqueness measure $U_c$ as tested in step 2606, then the current pixel is cyclicly decremented (by subtracting 1 modulo R) in step 2607 to return the current pixel to its original state, and the next pixel in the tile is selected at step 2608. However, if at step 2606 the modified current uniqueness measure $U_m$ is greater than the current uniqueness measure $U_c$ then the current uniqueness measure is made equal to the modified uniqueness measure at step 2609. Provided the number of unique window codes is less than the number of pixels in the tile, as tested in step 2610, the process 2506 selects the next pixel at step 2608 and continues to step 2604. However, if at step 2610 all window codes in the tile are now unique, then the process 2506 saves the TBPS tile at step 2611 to the memory 1806, 1810 and the process 2506 exits.

The basic features of the exemplary pattern 2700 of FIG. 27 are now described. The pattern 2700 is formed by a confluence of R-plane patterns, each R-plane pattern being formed by a 2D tiling of a corresponding perfect submap pattern 2708. In the example of FIG. 27 there are three 3-planes each formed from a corresponding differently sized perfect submap pattern 2702, 2704 and 2706. The submaps 2702, 2704 and 2706 in this example are co-prime, where the submap 2702 has a size of 11×11 pixels, the submap 2704 has a size of 12×12 pixels and the submap 2706 has a size of 13×13 pixels. An LCM tiling of the co-prime submaps give an overall dimension of the pattern 1900 of (11×12×13)×(11×12×13)=1716×1716 pixels. The three bit-planes 2702-2706 combine to give 27 greyscale image intensities available for pixels in the pattern 2700, as depicted in the exemplary portion 2710 in FIG. 27. The effect of using the perfect submaps in this fashion is that, for a small group of pixels (in this case a 5 pixel cross shaped block as per FIG. 21B), there are no repetitions in the pattern and thus each pixel location in the pattern may be uniquely resolved.

Considering the pattern 2700 more generally, each R-plane is formed of a non-overlapping periodic repetition of a R-ary block (i.e. a tiling of the R-ary block), such that for each of the dimensions of the tiled R-ary blocks, the least common multiple of each of the sizes of the tiled R-ary blocks in that dimension is greater than the size of the pattern in the same dimension and such that any R-ary sub-block of a predetermined size less than the tiled binary blocks occurs only on a regular grid with the same periodicity as the tiled R-ary block for that R-plane. This permits the tilings to be performed using sizes that are not co-prime, provided the overall pattern is sized to preclude ambiguity. Once formed, the pattern may itself be tiled, and ambiguities arising from such implementations are generally be readily resolvable due to the significant displacement of unique locations in each tile.

Processing of the captured TRPS based pattern follows in the same way as for TBPS based patterns, except that the captured image is divided into R-planes (planes of radix R), rather than bitplanes (planes of radix 2).

A local histogram analysis can be used to identify the local quantized intensity levels in the captured image. This allows the code value C in a local region to be extracted. For a pattern with n R-planes the code values will be integer values from 0 to $R^n-1$. The code values for the R-planes are extracted as the successive remainders upon division by R of the partial code for the R-planes.

$$r_n = C_n - R^* \text{int}(C_n/R). \quad (23)$$

where int returns the integer part of its argument and the partial code $C_0=C$ and the partial code for successive r-planes is $$C_{n+1} = \text{int}(C_n/R). \quad (24)$$

Figure 16:
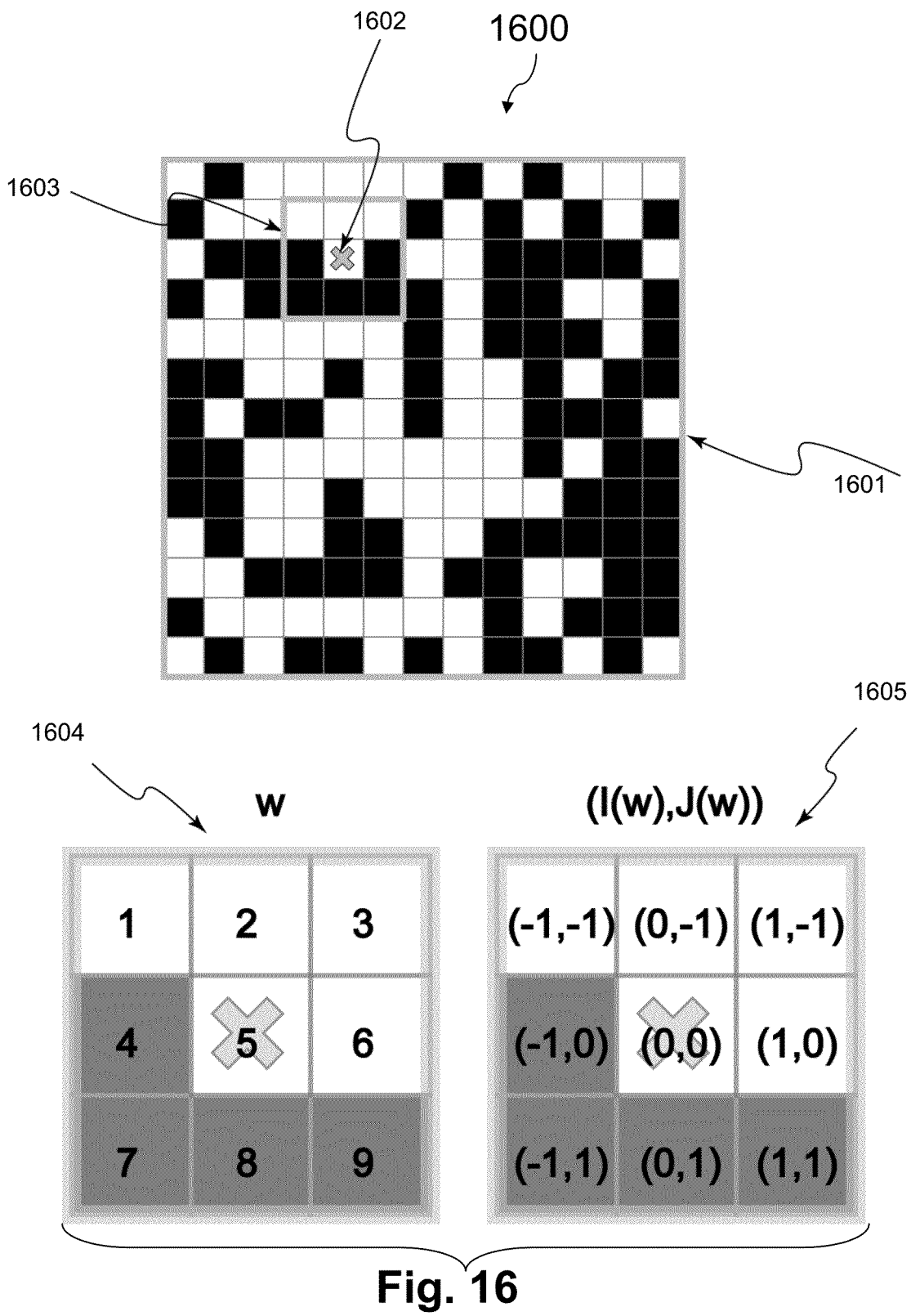
FIG. 16 illustrates the extraction of a window code from the defined window around a selected point in a TBPS.

The window code $W_{i,j,n}$ for the pixel in the $n^{th}$ r-plane at index position (i, j) in the captured image can be represented mathematically as $$W_{i,j,n} = \sum_w C_{i-I(w), j-J(w), n} R^w. \quad (25)$$

where $C_{i-I(w), j-J(w), w}$ is the value at the $w^{th}$ code-window location (taking a value from 0 to R−1) which is offset from the pixel (i,j) by offsets of (I(w),J(w)) 1605 as seen in FIG. 16.

INDUSTRIAL APPLICABILITY

The arrangements described are applicable to the computer and data processing industries and particularly for the imaging of three dimensional objects. This can permit or at least assist 3D graphical computerized representation of objects, amongst other uses.

The foregoing describes only some embodiments of the present invention, and modifications and/or changes can be made thereto without departing from the scope and spirit of the invention, the embodiments being illustrative and not restrictive.

In the context of this specification, the word "comprising-"means "including principally but not necessarily solely" or "having" or "including", and not "consisting only of". Variations of the word "comprising", such as "comprise" and "comprises"have correspondingly varied meanings.

The invention claimed is:

1. A computer-implemented method of determining a two-dimensional position of a location captured in an image, said method comprising:
    forming a two-dimensional greyscale pattern, said two-dimensional pattern comprising a plurality of R-planes, wherein each said R-plane pattern comprises a tiling of a corresponding R-ary block, being a block of radix R integer values, such that for each dimension of the pattern, the least common multiple of each of the sizes of said corresponding tiled R-ary blocks in that dimension is greater than the size of the pattern in the same dimension, and such that any R-ary sub-block of a predetermined size less than the tiled R-ary blocks occurs only on a regular grid with the same periodicity as the tiled R-ary block for that R-plane;
    imparting the two-dimensional pattern onto a scene;
    capturing an image of the scene including the projected two-dimensional pattern;
    determining from the captured image a sub-block associated with the location and constructing, from a R-ary representation of the sub-block, a unique integer value for each R-plane, being a representation of the pattern in the R-plane of the sub-block associated with the location; and
    using said unique integer values from each R-plane to determine the location in the image.

2. A method according to claim 1 wherein the radix of the R-planes is 2, by which the method forms bit-planes and binary blocks.

3. A method according to claim 1, wherein at least one tiled R-ary block comprises a perfect map.

4. A method according to claim 1, wherein each said tiled R-ary block is a perfect submap.

5. A method according to claim 1, wherein the forming of the two-dimensional pattern comprises:
    generating a plurality of perfect R-ary submaps such that a least common multiple of the sizes of the submaps is larger than a desired size of the pattern;
    tiling each of the submaps to form a corresponding plurality of R-ary patterns each having a size of the least common multiple; and
    combining the patterns as R-planes to form the greyscale pattern.

6. A method according to claim 5, wherein the generating comprises:
    setting a number of R-planes;
    setting a size and shape of a 2D code window;
    setting co-prime sizes for tiles in each R-plane;
    initializing the 2D greyscale pattern; and for each R-plane:
  generating a tileable R-ary perfect submap (TRPS) tile for the R-plane; and
  tiling the R-plane with the generated TRPS tile.

7. A method according to claim 2, wherein the forming of the two-dimensional pattern comprises:
  generating a plurality of perfect binary submaps such that a least common multiple of the sizes of the submaps is larger than a desired size of the pattern;
  tiling each of the submaps to form a corresponding plurality of binary patterns each having a size of the least common multiple; and
  combining the patterns as bit-planes to form the greyscale pattern.

8. A method according to claim 7 wherein the submaps comprise toroidal binary perfect submaps.

9. A method according to claim 1, comprising:
  forming an image that is a sinusoidal function of a phase formed from the greyscale pattern;
  phase shifting the said image to create a plurality of phase shifted images;
  projecting the plurality of phase shifted images in sequence onto the surface;
  using phase shifting techniques to recover a phase from a corresponding sequence of captured images independent of variations of at least one of ambient lighting, surface colour and surface reflectance.

10. A method according to claim 9 wherein scaled and offset cosine of the phase shifted images are projected.

11. A method according to claim 1, wherein the imparting of the pattern onto the scene comprises projecting the pattern onto the scene.

12. A method according to claim 1, wherein the scene is one of a two-dimensional scene or a three-dimensional scene.

13. A system for mapping surface shape at a location on a three-dimensional (3D) shape; said system comprising:
  (a) a projection arrangement by which a two-dimensional (2D) greyscale pattern in projected a surface of the 3D shape, the greyscale pattern comprising a plurality of R-planes, wherein each said R-plane comprises a tiling of a corresponding R-ary block, being a block of radix R integer values, such that for each dimension of the pattern, the least common multiple of each of the sizes of said corresponding tiled R-ary blocks in that dimension is greater than the size of the pattern in the same dimension, and such that any R-ary sub-block of a predetermined size less than the tiled R-ary blocks occurs only on a regular grid with the same periodicity as the tiled R-ary block for that R-plane;
  (b) an imaging device configured to capture an image of the 3D shape with the greyscale pattern projected thereupon;
  (c) an image processing arrangement configured to process the captured image to:
    (i) separate the captured image into each of the plurality of bit-planes;
    (ii) process a most significant one of the bit-planes to determine a local affine mapping within the captured image;
    (iii) processing the local affine mapping using the Chinese Remainder Theorem to recover the location; and
    (iv) mapping the recovered location to a unique position in the 2D greyscale pattern and utilizing projection geometry between the projection arrangement and the imaging device to recover surface shape information thereby mapping surface shape of the 3D surface at the location.

14. A non-transitory computer readable storage medium having a computer program recorded thereon, the program being executable by computer apparatus to determine a two-dimensional position of a location captured in an image, said program comprising:
  code for forming a two-dimensional greyscale pattern, said two-dimensional pattern comprising a plurality of R-planes, wherein each said R-plane comprises a tiling of a corresponding R-ary block, being a block of radix R integer values, such that for each dimension of the pattern, the least common multiple of each of the sizes of said corresponding tiled R-ary blocks in that dimension is greater than the size of the pattern in the same dimension, and such that any R-ary sub-block of a predetermined size less than the tiled R-ary blocks occurs only on a regular grid with the same periodicity as the tiled R-ary block for that R-plane;
  code for projecting the two-dimensional pattern onto a three-dimensional scene;
  code for capturing an image of the scene including the projected two-dimensional pattern;
  code for determining from the captured image a sub-block associated with the location and constructing, from a R-ary representation of the sub-block, a unique integer value for each R-plane, being a representation of the pattern in the R-plane of the sub-block associated with the location; and
  code for using the said unique integer values from each R-plane to determine the location in the image.

15. A computer-implemented method for determining a two-dimensional position of a location captured in an image, said method comprising:
  forming a two-dimensional pattern, said two-dimensional pattern comprising a plurality of bit-planes, wherein each said bit-plane comprises a tiling of a corresponding binary block, such that for each dimension of the two-dimensional pattern, the least common multiple of each of the sizes of said corresponding tiled binary blocks in that dimension is greater than the size of the two-dimensional pattern in the same dimension, and such that any binary sub-block of a predetermined size less than the tiled binary blocks occurs only on a regular grid with the same periodicity as the tiled binary block for that bit-plane;
  projecting the two-dimensional pattern onto a three-dimensional scene;
  capturing an image of the scene including the projected two-dimensional pattern;
  determining from the captured image a sub-block associated with the location;
  constructing, from a binary representation of the sub-block, a unique integer value for each bit-plane, being a representation of the projected two-dimensional pattern in the bit-plane of the sub-block associated with the location; and
  using said unique integer values from each bit-plane to determine the location in the image.

* * * * *